United States Patent
Ryu et al.

(10) Patent No.: US 11,470,569 B2
(45) Date of Patent: Oct. 11, 2022

(54) UPLINK TRANSMISSIONS WITHOUT UPLINK TIMING CONTROL AND MEASUREMENT

(71) Applicant: QUALCOMM Incorporated, San Diego, CA (US)

(72) Inventors: Jung Ho Ryu, Fort Lee, NJ (US); Navid Abedini, Somerset, NJ (US); Junyi Li, Chester, NJ (US); Karl Georg Hampel, Hoboken, NJ (US); Sundar Subramanian, San Diego, CA (US); Muhammad Nazmul Islam, Edison, NJ (US); Jianghong Luo, Skillman, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/178,969

(22) Filed: Nov. 2, 2018

(65) Prior Publication Data
US 2019/0159147 A1    May 23, 2019

Related U.S. Application Data

(60) Provisional application No. 62/589,060, filed on Nov. 21, 2017.

(51) Int. Cl.
*H04B 7/08* (2006.01)
*H04Q 1/20* (2006.01)
(Continued)

(52) U.S. Cl.
CPC ........ *H04W 56/004* (2013.01); *H04B 7/0617* (2013.01); *H04L 43/0864* (2013.01);
(Continued)

(58) Field of Classification Search
CPC ............... H04W 56/004; H04W 16/14; H04W 28/0273; H04W 16/28; H04W 24/08;
(Continued)

(56) References Cited

U.S. PATENT DOCUMENTS 8,295,243 B2    10/2012    Malladi et al.
8,811,419 B2 *    8/2014    Isobe ..................... H04L 47/27
                                                                370/413
(Continued)

FOREIGN PATENT DOCUMENTS

CN    102421125 A    4/2012
CN    105897390 A    8/2016
(Continued)

OTHER PUBLICATIONS

David Comstock "Uplink Allocation Window Start Time for Relay Stations" (Year: 2008).*

(Continued)

*Primary Examiner* — Edan Orgad
*Assistant Examiner* — Vanneilian Lalchinthang
(74) *Attorney, Agent, or Firm* — Danai Nelisile Mhembere; Holland & Hart LLP

(57) ABSTRACT

Methods, systems, and devices for wireless communications are described. A base station may transmit a downlink message to a user equipment (UE). The base station may allocate a receive time window associated with receiving an uplink message from the UE responsive to the downlink message, wherein the receive time window is allocated based at least in part on a maximum propagation round trip time (RTT) associated with UEs within a coverage area of the base station and a frame size of the uplink message. The base station may monitor the receive time window for the (Continued)

uplink message from the UE. The base station may receive the uplink message from the UE during the receive time window.

31 Claims, 20 Drawing Sheets

(51) Int. Cl.
| | | |
|---|---|---|
| *H04W 56/00* | (2009.01) | |
| *H04W 72/04* | (2009.01) | |
| *H04W 16/28* | (2009.01) | |
| *H04W 24/08* | (2009.01) | |
| *H04B 7/06* | (2006.01) | |
| *H04W 16/14* | (2009.01) | |
| *H04L 43/0864* | (2022.01) | |
| *H04B 7/0413* | (2017.01) | |

(52) U.S. Cl.
CPC .......... *H04W 16/14* (2013.01); *H04W 16/28* (2013.01); *H04W 24/08* (2013.01); *H04W 56/00* (2013.01); *H04W 56/001* (2013.01); *H04W 56/0065* (2013.01); *H04W 72/0446* (2013.01); *H04B 7/0413* (2013.01)

(58) Field of Classification Search
CPC ............... H04W 56/00; H04W 56/001; H04W 56/0065; H04W 72/0446; H04B 7/0617; H04B 7/0413; H04L 43/0864; H04L 67/1008; G01S 5/021
USPC .......................................................... 370/329
See application file for complete search history.

(56) References Cited

U.S. PATENT DOCUMENTS

| | | | | |
|---|---|---|---|---|
| 9,432,120 | B2* | 8/2016 | Kramer | H04B 10/25 |
| 9,924,525 | B2 | 3/2018 | Sadiq et al. | |
| 10,396,873 | B2* | 8/2019 | Guey | H04B 7/0617 |
| 2005/0170841 | A1* | 8/2005 | Sagfors | H04L 67/101 |
| | | | | 455/453 |
| 2005/0213586 | A1* | 9/2005 | Cyganski | H04L 41/0896 |
| | | | | 370/395.41 |
| 2009/0318089 | A1 | 12/2009 | Stratford et al. | |
| 2010/0111070 | A1* | 5/2010 | Hsu | H04J 3/0682 |
| | | | | 370/350 |
| 2011/0169691 | A1* | 7/2011 | Thomson | G01S 19/09 |
| | | | | 342/357.42 |
| 2012/0076214 | A1* | 3/2012 | Wei | H04L 25/0204 |
| | | | | 375/259 |
| 2012/0106342 | A1* | 5/2012 | Sundararajan | H04L 47/193 |
| | | | | 370/235 |
| 2016/0080207 | A1* | 3/2016 | Prakash | H04L 47/18 |
| | | | | 370/231 |
| 2016/0087705 | A1* | 3/2016 | Guey | H04L 5/0023 |
| | | | | 370/336 |
| 2017/0078913 | A1* | 3/2017 | Chang | H04L 47/193 |
| 2017/0142620 | A1* | 5/2017 | Rune | H04W 72/042 |
| 2017/0195033 | A1* | 7/2017 | Zhang | H04W 72/046 |
| 2018/0288687 | A1* | 10/2018 | Graffagnino | H04W 48/16 |

FOREIGN PATENT DOCUMENTS

| | | |
|---|---|---|
| CN | 107124753 A | 9/2017 |
| EP | 2738984 A1 | 6/2014 |
| WO | WO-2008024788 A2 | 2/2008 |
| WO | WO-2016138153 | 9/2016 |

OTHER PUBLICATIONS

David Comstock: "Uplink Allocation Window Start Time for Relay Stations," Aug. 17, 2008 (Aug. 17, 2008), XP055548841, 9 pages, Retrieved from the Internet: URL:http://www.ieee802.org/16/relay/contrib/S80216j-08_132r1.pdf [retrieved on Jan. 29, 2019].
International Search Report and Written Opinion—PCT/US2018/059246—ISA/EPO—dated Feb. 12, 2019 (180556WO).

\* cited by examiner

UPLINK TRANSMISSIONS WITHOUT UPLINK TIMING CONTROL AND MEASUREMENT

CROSS REFERENCES

The present Application for Patent claims the benefit of U.S. Provisional Patent Application No. 62/589,060 by RYU et al., entitled "UPLINK TRANSMISSIONS WITHOUT UPLINK TIMING CONTROL AND MEASUREMENT," filed Nov. 21, 2017, assigned to the assignee hereof, and expressly incorporated by reference herein.

BACKGROUND

The following relates generally to wireless communication, and more specifically to uplink transmissions without uplink timing control and measurement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Communications in a mmW network may be highly directional and line-of-sight (LOS) dependent. These features of a mmW network may be amplified in specific environments. For example, the directionality of a mmW network may be enhanced when operated in a particular deployment scenario, such as a subway or train environment, where UEs associated with the train tend to move in a limited number of directions (e.g., as determined by the movement of the train).

Communication may have an associated round-trip-time (RTT) that varies based on the distance between the transmitting device and the receiving device. The RTT may broadly refer to the time it takes for a signal to propagate from the transmitting device to the receiving device, for the receiving device to process the signal and transmit a response signal, and for the transmitting device to receive the response signal. In a downlink communication example, this results in a time gap ($\Delta$) between the end of a downlink message transmitted from the base station and the beginning of a responsive uplink message received at the base station. This may introduce complexity in that the base station may benefit from knowing when to look for the uplink message, e.g., when to configure a receive beam configuration to receive the uplink message. Conventional techniques may include the base station instructing the UE to advance its uplink transmission time by a certain value ($\varepsilon$) in order for the base station to know when to look for the uplink message. This timing advance process, however, includes the base station and UE exchanging timing measurement signals, timing commands, etc., during a timing advance procedure. The timing advance procedure, therefore, utilizes a considerable amount of valuable overhead resources.

SUMMARY

The described techniques relate to improved methods, systems, devices, or apparatuses that support uplink transmissions without uplink timing control and measurement. Generally, the described techniques provide for omission of the timing advance procedure. For example, the base station and the user equipment (UE) may not perform a timing advance procedure and, instead, may use a time window to determine when the base station is expected to receive an uplink message from the UE. The time window may be based, at least in certain aspects, on the UE beginning its uplink message transmission at the beginning of its scheduled uplink transmit window. For example, the base station may transmit a downlink message to the UE. The base station may then allocate a time window (a receive time window from the base station's perspective) in which the base station expects to receive an uplink message responsive to the downlink message. The time window may be allocated based on the size of the expected uplink message, based on a maximum round-trip-time (RTT) of associated UE(s), based on an error metric (e.g., a margin of error associated with how confident the base station is in the time window allocation), and the like. The UE may receive the downlink message and identify the time window (e.g., a transmit time window from the UE perspective) to use for transmitting the responsive uplink message. In one example, the UE's time window may be that the UE transmits the uplink message immediately after receiving the downlink message (e.g., at the start of the transmit time window). In another example, the UE's time window may be after a different UE has transmitted its own uplink message. The UE may then transmit, and the base station may receive, the uplink message during the time window without having to perform and/or maintain a timing advance procedure.

A method of wireless communication is described. The method may include transmitting a downlink message to a UE, allocating a receive time window associated with receiving an uplink message from the UE responsive to the downlink message, the receive time window is allocated based at least in part on a maximum propagation RTT associated with UEs within a coverage area of the base station and a frame size of the uplink message, monitoring the receive time window for the uplink message from the UE, and receiving the uplink message from the UE during the receive time window.

An apparatus for wireless communication is described. The apparatus may include means for transmitting a downlink message to a UE, means for allocating a receive time window associated with receiving an uplink message from the UE responsive to the downlink message, the receive time window is allocated based at least in part on a maximum propagation RTT associated with UEs within a coverage area of the base station and a frame size of the uplink message, means for monitoring the receive time window for the uplink message from the UE, and means for receiving the uplink message from the UE during the receive time window.

Another apparatus for wireless communication is described. The apparatus may include a processor, memory in electronic communication with the processor, and instructions stored in the memory. The instructions may be operable to cause the processor to transmit a downlink message to a UE, allocate a receive time window associated with receiving an uplink message from the UE responsive to the downlink message, the receive time window is allocated based at least in part on a maximum propagation RTT associated with UEs within a coverage area of the base station and a frame size of the uplink message, monitor the receive time window for the uplink message from the UE, and receive the uplink message from the UE during the receive time window.

A non-transitory computer-readable medium for wireless communication is described. The non-transitory computer-readable medium may include instructions operable to cause a processor to transmit a downlink message to a UE, allocate a receive time window associated with receiving an uplink message from the UE responsive to the downlink message, the receive time window is allocated based at least in part on a maximum propagation RTT associated with UEs within a coverage area of the base station and a frame size of the uplink message, monitor the receive time window for the uplink message from the UE, and receive the uplink message from the UE during the receive time window.

In some examples of the method, apparatus, and non-transitory computer-readable medium described herein, transmitting the downlink message comprises: transmitting the downlink message without a request that the UE use a timing advance in connection with the uplink message.

Some examples of the method, apparatus, and non-transitory computer-readable medium described herein may further include processes, features, means, or instructions for identifying an error tolerance metric associated with the maximum propagation RTT, the receive time window may be allocated based at least in part on the error tolerance metric.

Some examples of the method, apparatus, and non-transitory computer-readable medium described herein may further include processes, features, means, or instructions for configuring a preamble of the downlink message to indicate a timing parameter associated with the downlink message.

In some examples of the method, apparatus, and non-transitory computer-readable medium described herein, configuring the preamble comprises: configuring at least one of a reference signal, or a synchronization signal, or a beam refinement signal, or a combination thereof, to indicate the timing parameter.

In some examples of the method, apparatus, and non-transitory computer-readable medium described herein, the downlink message may be transmitted during a transmit time window.

Some examples of the method, apparatus, and non-transitory computer-readable medium described herein may further include processes, features, means, or instructions for receiving the uplink message using a base station receive beam configuration, the uplink message may be a millimeter wave transmission.

Some examples of the method, apparatus, and non-transitory computer-readable medium described herein may further include processes, features, means, or instructions for determining that the UE may be operating in a high mobility state, the receive time window may be allocated based at least in part on the high mobility state.

In some examples of the method, apparatus, and non-transitory computer-readable medium described herein, the receive time window may be allocated based at least in part on a timing advance procedure not being performed.

Some examples of the method, apparatus, and non-transitory computer-readable medium described herein may further include processes, features, means, or instructions for decoding a preamble of the uplink message to identify a timing parameter associated with the uplink message, the receive time window may be allocated based at least in part on the timing parameter.

In some examples of the method, apparatus, and non-transitory computer-readable medium described herein, the preamble comprises at least one of a reference signal, or a synchronization signal, or a beam refinement signal, or a combination thereof, to indicate the timing parameter, or a combination thereof.

A method of wireless communication is described. The method may include receiving a downlink message from a base station, identifying a transmit time window allocated for an uplink message responsive to the downlink message, the transmit time window is allocated based at least in part on a maximum propagation RTT associated with UEs within a coverage area of the base station and a frame size of the uplink message, and transmitting the uplink message to the base station during an initial period of the transmit time window.

An apparatus for wireless communication is described. The apparatus may include means for receiving a downlink message from a base station, means for identifying a transmit time window allocated for an uplink message responsive to the downlink message, the transmit time window is allocated based at least in part on a maximum propagation RTT associated with UEs within a coverage area of the base station and a frame size of the uplink message, and means for transmitting the uplink message to the base station during an initial period of the transmit time window.

Another apparatus for wireless communication is described. The apparatus may include a processor, memory in electronic communication with the processor, and instructions stored in the memory. The instructions may be operable to cause the processor to receive a downlink message from a base station, identify a transmit time window allocated for an uplink message responsive to the downlink message, the transmit time window is allocated based at least in part on a maximum propagation RTT associated with UEs within a coverage area of the base station and a frame size of the uplink message, and transmit the uplink message to the base station during an initial period of the transmit time window.

A non-transitory computer-readable medium for wireless communication is described. The non-transitory computer-readable medium may include instructions operable to cause a processor to receive a downlink message from a base station, identify a transmit time window allocated for an uplink message responsive to the downlink message, the transmit time window is allocated based at least in part on a maximum propagation RTT associated with UEs within a coverage area of the base station and a frame size of the uplink message, and transmit the uplink message to the base station during an initial period of the transmit time window.

In some examples of the method, apparatus, and non-transitory computer-readable medium described herein, transmitting the uplink message comprises: transmitting the uplink message without first applying a timing advance in connection with the uplink message.

In some examples of the method, apparatus, and non-transitory computer-readable medium described herein, the transmit time window may be identified based at least in part on the downlink message.

Some examples of the method, apparatus, and non-transitory computer-readable medium described herein may further include processes, features, means, or instructions for decoding a preamble of the downlink message to identify an indication of a timing parameter associated with the downlink message.

In some examples of the method, apparatus, and non-transitory computer-readable medium described herein, the preamble comprises at least one of a reference signal, or a synchronization signal, or a beam refinement signal, or a combination thereof, indicating the timing parameter.

Some examples of the method, apparatus, and non-transitory computer-readable medium described herein may further include processes, features, means, or instructions for receiving the downlink message using a UE receive beam configuration, the downlink message may be a millimeter wave transmission.

In some examples of the method, apparatus, and non-transitory computer-readable medium described herein, the uplink message may be transmitted in response to receiving the downlink message and may be transmitted immediately after receiving the downlink message.

In some examples of the method, apparatus, and non-transitory computer-readable medium described herein, the transmit time window may be allocated based at least in part on a timing advance procedure not being performed.

Some examples of the method, apparatus, and non-transitory computer-readable medium described herein may further include processes, features, means, or instructions for configuring a preamble of the uplink message to indicate a timing parameter associated with the uplink message.

In some examples of the method, apparatus, and non-transitory computer-readable medium described herein, configuring the preamble comprises: configuring at least one of a reference signal, or a synchronization signal, or a beam refinement signal, or a combination thereof, to indicate the timing parameter.

Some examples of the method, apparatus, and non-transitory computer-readable medium described herein may further include processes, features, means, or instructions for identifying an error tolerance metric associated with the maximum propagation RTT, the transmit time window may be allocated based at least in part on the error tolerance metric.

Some examples of the method, apparatus, and non-transitory computer-readable medium described herein may further include processes, features, means, or instructions for transmitting the uplink message using a UE transmit beam configuration, the uplink message may be a millimeter wave transmission.

DETAILED DESCRIPTION

Figure 1:
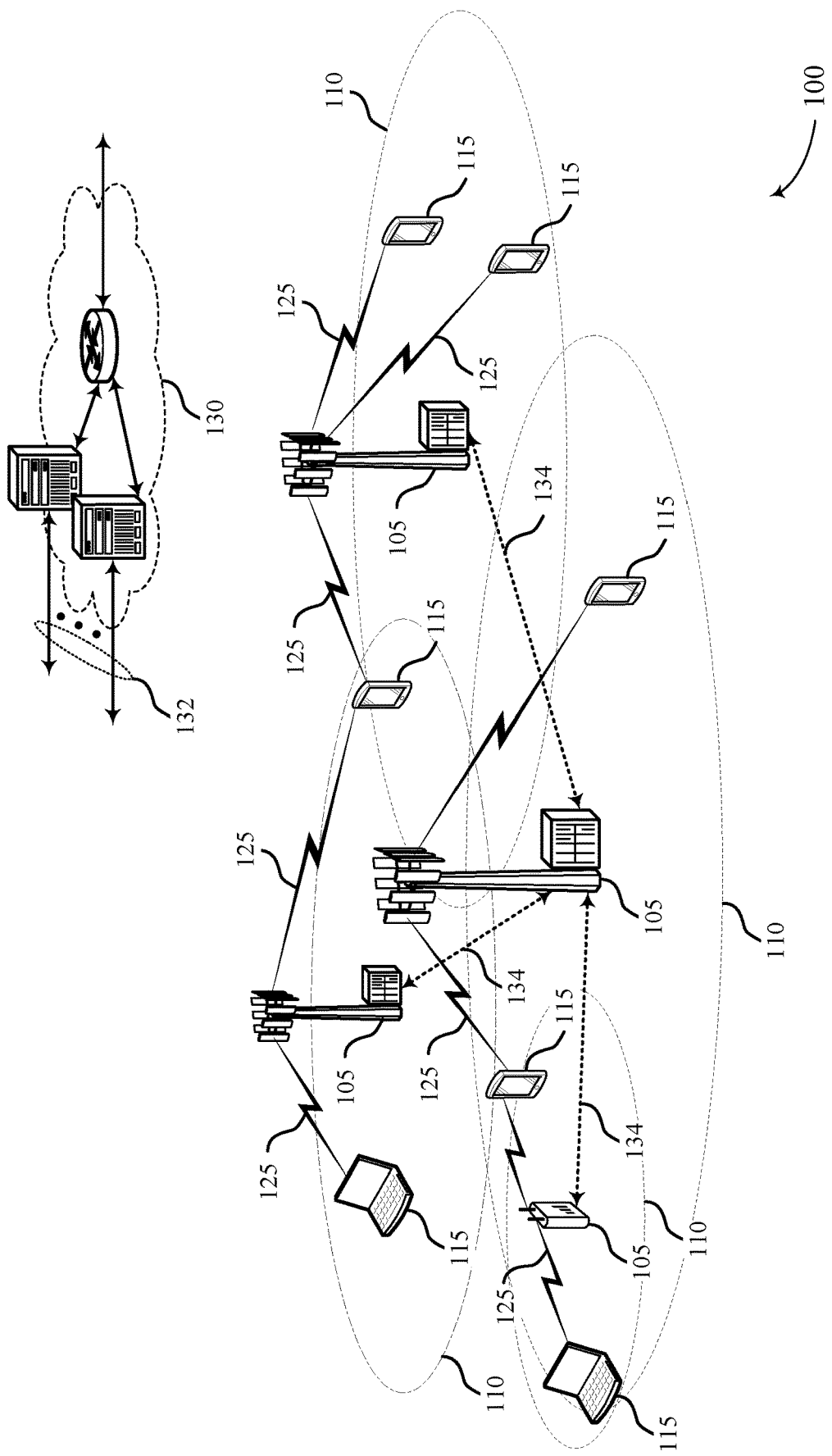
FIG. 1 illustrates an example of a system for wireless communication that supports uplink transmissions in accordance with aspects of the present disclosure.

Next generation wireless communications systems may rely on millimeter wave (mmW) communication technologies. mmW technologies typically use beamformed transmissions/receptions to provide directional communications. Each beamformed transmission/reception may have an associated beam configuration, such as a beam width, a beam direction, a beam shape, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like). The transmit/receive beams may change for each transmission.

mmW wireless communications systems present unique challenges with respect to timing, interference management, medium access, and the like. For example, the directionality of transmissions and/or receptions prove a certain level of deafness in a mmW network, e.g., a device may be "deaf" with respect to an incoming beamformed signal if the device's receive beam configuration isn't directed toward the transmitting device. Accordingly, timing (e.g., the transmitting device knowing when to transmit a message and/or the receiving device knowing when to expect to receive the signal) may become an important consideration. Conventional timing protocol may rely on a timing advance procedure between the transmitting/receiving devices. However, the timing advance procedure may require multiple timing signals and/or timing commands being exchanged, which takes considerable time to complete and uses valuable overhead resources.

Aspects of the disclosure are initially described in the context of a wireless communications system. Broadly, aspects of the disclosure provide for omission of the timing advance procedure and, instead, use of a timing window between the transmitting device and receiving device. For example, and in a downlink scenario, the base station may transmit a downlink message to the UE. The downlink message may include a grant, downlink data, etc. The UE may have an uplink message, e.g., acknowledgement/negative acknowledgement (ACK/NACK), uplink data, etc., to transmit to the base station in response to the downlink message. Accordingly, the base station may rely on the round trip time (RTT) and size of the expected uplink message to allocate a receive time window. In some instances, the base station may rely on a maximum RTT expected for UEs within its coverage area, in order to allocate a receive time window. Generally, the receive time window of the base station may be a time period in which the base station expects to receive the uplink message from the UE. Similarly, the UE may also identify a transmit time window. Generally, the transmit time window of the UE may be a time period in which the UE transmits the uplink message in order for the uplink message to be received during the receive time window of the base station. The base station may monitor for and receive the uplink message during the receive time window and the UE may transmit the uplink message during the transmit time window. Accordingly, the communications between the base station and UE may occur without any sort of timing advance procedure.

Aspects of the disclosure may be used in environments where a maximum RTT of UEs within a coverage area of a base station is small enough so as to not result in significant communication delays. One example of an applicable environment is a train environment, where UEs on a train are in communication with base stations along the train route. The base stations may be positioned along the train route such that a linear density of the base stations along the train route facilitates relatively small maximum RTTs for UEs associated with the trains.

Aspects of the disclosure are further illustrated by and described with reference to apparatus diagrams, system diagrams, and flowcharts that relate to uplink transmissions without uplink timing control and measurement.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a base station 105 may transmit a downlink message to a UE 115. The base station 105 may allocate a receive time window associated with receiving an uplink message from the UE 115 responsive to the downlink message. The receive time window may be allocated based at least in part on a maximum propagation RTT associated with UEs 115 within a coverage area of the base station 105 and a frame size of the uplink message. The base station 105 may monitor the receive time window for the uplink message from the UE 115 and receive the uplink message from the UE 115 during the receive time window.

In some cases, a UE 115 may receive a downlink message from a base station 105. The UE 115 may identify a transmit time window allocated for an uplink message responsive to the downlink message. The transmit time window may be allocated based at least in part on a maximum propagation RTT associated with UEs 115 within a coverage area of the base station 105 and a frame size of the uplink message. The UE 115 may transmit the uplink message to the base station 105 during an initial period of the transmit time window.

In some cases, timing advance procedures for beamform scheduling, transmission, and reception require significant resource overhead, such as signal processing, compute, transmission, and reception overhead. Furthermore, timing advance procedures may not be suitable in a high mobility (e.g., UE 115 mobility) environment. The implementations described herein provide communication techniques between a UE 115 and a base station 105 without the resource intensive timing advance procedures. Accordingly, significant processing resources are saved, and the timing advance procedure may be avoided in high-mobility environments.

Figure 2:
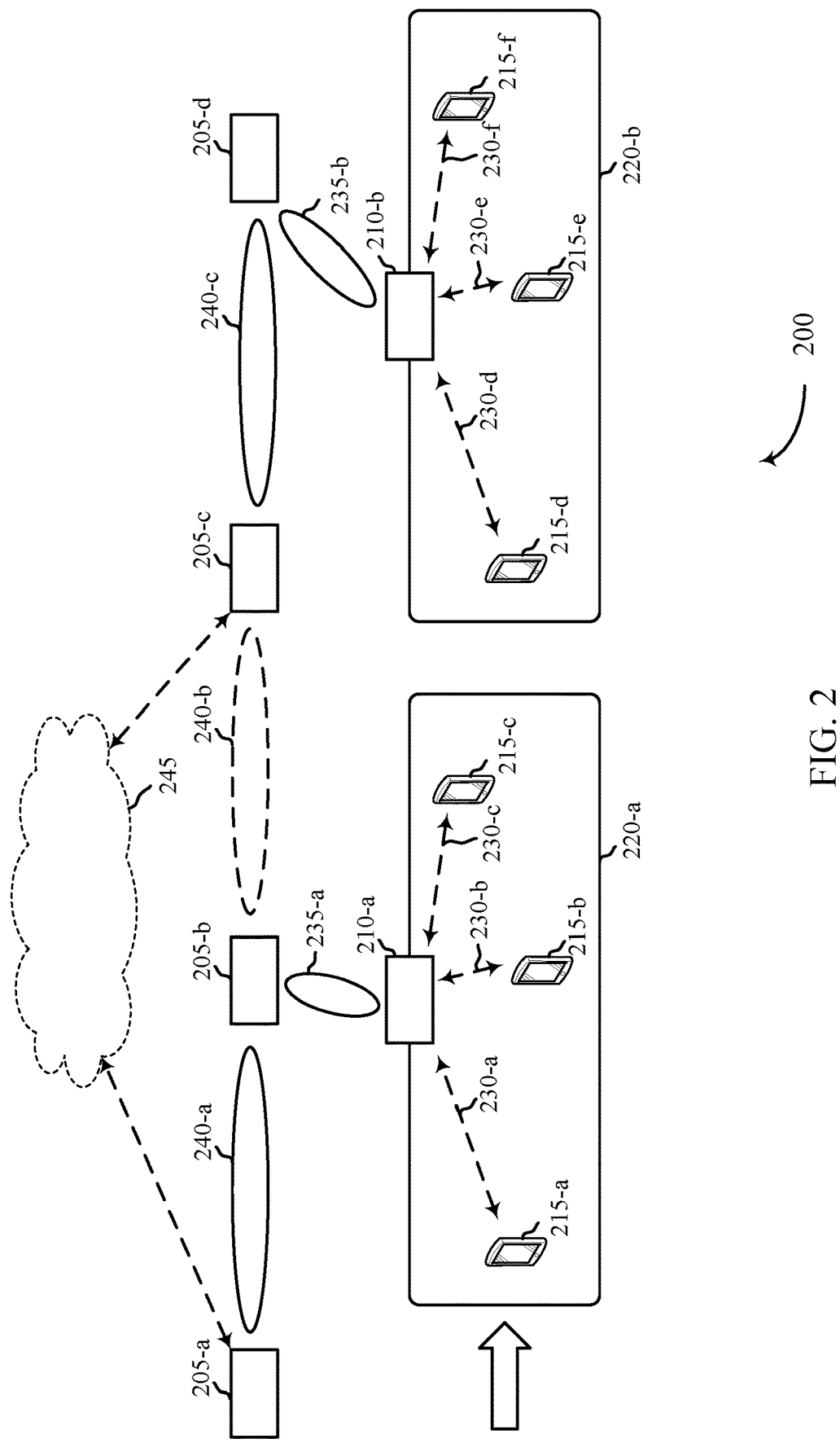
FIG. 2 illustrates an example of a system for wireless communication that supports uplink transmissions in accordance with aspects of the present disclosure.

FIG. 2 illustrates an example of a system for wireless communications system 200 that supports uplink transmissions in accordance with various aspects of the present disclosure. In some examples, wireless communications system 200 may implement aspects of wireless communications system 100. Wireless communications system 200 may include a plurality of base stations 205, relay UE 210, and UE 215, which may be examples of the corresponding devices described herein.

In some aspects, the deployment scenario of wireless communications system 200 may include relay UEs 210 being mounted into vehicles 220. For example, relay UE 210-a may be mounted into vehicle 220-a and relay UE 210-b may be mounted into vehicle 220-b. Each of the vehicles 220 may include any mobile vehicle, such as an automobile, a bus, a train, a boat, a ship, a plane, and the like, that travels along a path. Accordingly, each base station 205 may be mounted in a fixed location and communicate with the relay UE 210 as the corresponding vehicle 220 traverses the coverage area of the respective base station 205.

In one non-limiting example, the wireless communications system 200 may support deployment of a system where the vehicles 220 (and hence the mounted relay UEs 215) are traveling at a high rate of speed, such as a high-speed rail system. Accordingly, relay UEs 210 may be considered in a high-mobility state of operation when the vehicles 220 are in motion.

In some aspects, wireless communications system 200 illustrates one example deployment of a heterogeneous wireless communications system that utilizes more than one radio access technology (RAT). As one example, base stations 205 may be mmW gNBs that perform inter-base station communications using beamformed signals 240 and/or using wired communication links (not shown). In some aspects, some or all of the base stations 205 may be connected to a core network 245 via a backhaul link, e.g., an integrated access backhaul (IAB). In the example illustrated in FIG. 2, only base stations 205-a and 205-c have direct connections to the core network 245. In this example, base station 205-b may connect to the core network 245 via beamformed signal 240-a through base station 205-a and/or optionally via beamformed signal 240-b through base station 205-c. Similarly, base station 205-d may connect to the core network 245 via beamformed signal 240-c through base station 205-c. As can be appreciated, the number and spacing of base stations 205 and/or direct backhaul connections to the core network 245 may vary and may depend on the particular deployment scenario.

Another example of the heterogeneous deployment may include wireless links 230 between relay UEs 210 and UEs 215. In some aspects, the number and/or position of UEs 215 within a vehicle 220 may vary at any given time. For example, certain UEs 215 may depart a vehicle 220 at a first stop while other UEs 215 enter vehicle 220 at the first stop. The number and/or position of UEs 215 may change for any given stop that vehicle 220 makes. When UEs 215 enter a vehicle, the UEs 215 may establish a wireless link 230 with the relay UE 210. The wireless link 230 may be an example of any wireless RAT, such as cellular, Wi-Fi, Bluetooth, Near Field Communication (NFC), and the like. UEs 215 may then access the core network 245 via the respective relay UE 215. Each relay UE 210 may access the core network 245 using a beamformed signal 235 through an associated base station 205. For example, UE 215-a may communicate with relay UE 210-a via wireless link 230-a, relay UE 210-a may communicate with base station 205-b via beamformed signal 235-a, base station 205-b may communicate with base station 205-a via beamformed signal 240-a, and base station 205-a may provide the direct link to core network 245. As another example and for vehicle 220-b, UE 215-e may communicate with relay UE 210-b via wireless link 230-e, relay UE 210-b may communicate with base station 205-d via beamformed signal 235-b, base station 205-d may communicate with base station 205-c via beamformed signal 240-c, and base station 205-c may provide the direct link to core network 245. In some examples, relay UE 210 may be a mmW relay UE.

In some aspects, as vehicles 220 travel along a path, relay UEs 210 may change the base station 205 that they are associated with. For example, relay UE 210-a may initially be connected to base station 205-b and, as vehicle 220-a travels, relay UE 210-a may leave the coverage area of base station 205-b and enter the coverage area of base station 205-c. Accordingly, relay UE 210-a may establish a new connection to base station 205-c.

In some aspects, the beam configuration for beamformed signals 235 for any given communication may vary depending upon where the relay UE 215 is located with respect to the base station 205 that it is connected to. For example, relay UE 210-a is located relatively closer to base station 205-b than relay UE 210-b is located with respect to base station 205-d. Accordingly, the beam configuration for beamformed signal 235-a has a different departure angle, beam direction, beam transmit power, and the like, than beamformed signal 235-b. Each beam configuration for beamformed signals 235 may have an associated beam index, e.g., an identifier that is associated with the beam configuration. The beam index being associated with a particular beam configuration may provide an indication of various parameters of the beam configuration, e.g., beam angle, beam departure angle, beam shape, beam transmit power, and the like. In some aspects, information indicative of the beam index is carried or otherwise conveyed in the associated beamformed signal 235.

In some aspects, the associated propagation time (e.g., maximum propagation RTT) for a particular beamformed signal 235 will also vary based on the distance and/or orientation between the relay UE 210 and the base station 205 that it is connected to. For example, the propagation RTT for beamformed signal 235-a is shorter than the propagation RTT for beamformed signal 235-b. Accordingly, base station 205-a may have a different associated propagation RTT with the relay UEs 210 that it is associated with than base station 205-d has with the relay UEs 210 that it is associated with. As the distance between the relay UE 210 and the base station 205 that it is connected to increases (e.g., as the relay UE 210 approaches the edge of the coverage area of one base station 205), the beam configuration and associated propagation RTT varies. In some aspects, the propagation RTT may also include processing time at the respective device, e.g., time for the device to process the message, reconfigure from transmit to receive mode, or vice versa, and the like.

To support wireless communications, such as beamformed signals 235, base stations 205 and relay UEs 210 may be configured to support omitting timing advance procedures in accordance with aspects of the present disclosure. Conventional timing advance techniques include the base station 205 exchanging various timing measurement signals, timing advance commands, and the like, in order to establish timing alignment. However, this technique takes considerable time and/or resources to complete and maintain. Instead, a base station 205 may communicate with relay UEs 210 using beamformed signals 235. The base station 205 may transmit downlink message(s) to the relay UEs 210. The base station 205 may then allocate a receive time window to the relay UE 210 for receiving an uplink message. In some aspects, the uplink message may be responsive to the downlink message. In other aspects, the uplink message may be unrelated to the downlink message. The base station 205 may use the maximum propagation RTT for the relay UEs 210 that are within the coverage area and the size (e.g., frame size) of the uplink message when allocating the receive time window. Generally, the receive time window may be the time period in which the base station 205 expects to receive the uplink message from the relay UE 210. In some aspects, the base station 205 may also use an error tolerance metric when allocating the receive time window. The error tolerance metric may be a timing value that is added to the receive time window in order to account for delays (e.g., processing delays, propagation delays, etc.) and/or discrepancies in the calculation of the size of the receive time window.

Accordingly, a relay UE 210 may receive the downlink message from the base station 205 and identify a transmit time window. Generally, the transmit time window is the time period in which the relay UE 210 can transmit the uplink message such that it is received by base station 205 during the receive time window. In some aspects, the relay UE 210 may transmit the uplink message immediately upon receipt of the downlink message. In some aspects, the relay UE 210 may transmit the uplink message at the very beginning of the transmit time window. Accordingly, the uplink message may have a sufficient time to propagate to and be received by the base station 205. The relay UE 210 may transit the uplink message during the transmit time window. The base station 205 may monitor for and receive the uplink message during the receive time window.

Accordingly, because the UE 210 and the base stations 205 transmit and receive signals without uplink timing control, valuable resources are not wasted on a timing advance procedure. Timing advance procedures require the base station 205 and the UE 210 to exchange timing measurement signals, timing commands, etc. The implementations described herein allow for the UE 210 and the base station 205 to avoid the processing, compute, and other resource overhead associated with the timing advance procedure. Furthermore, timing advance procedures may not be suitable to high mobility environments described herein, and the implementations described herein provide communications between UEs and base stations 205 in high mobility environments.

Figure 3A:
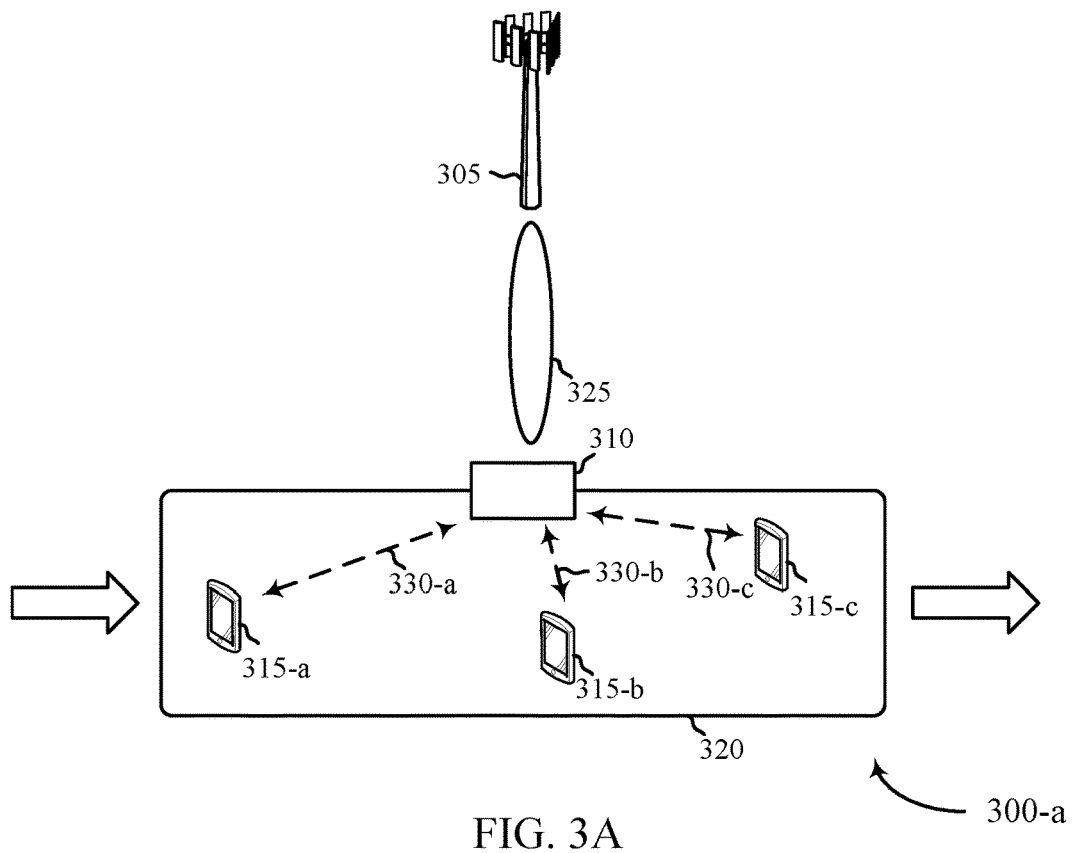
FIGS. 3A and 3B illustrate examples of aspects of a system for wireless communication that supports uplink transmissions in accordance with aspects of the present disclosure.
Figure 3B:
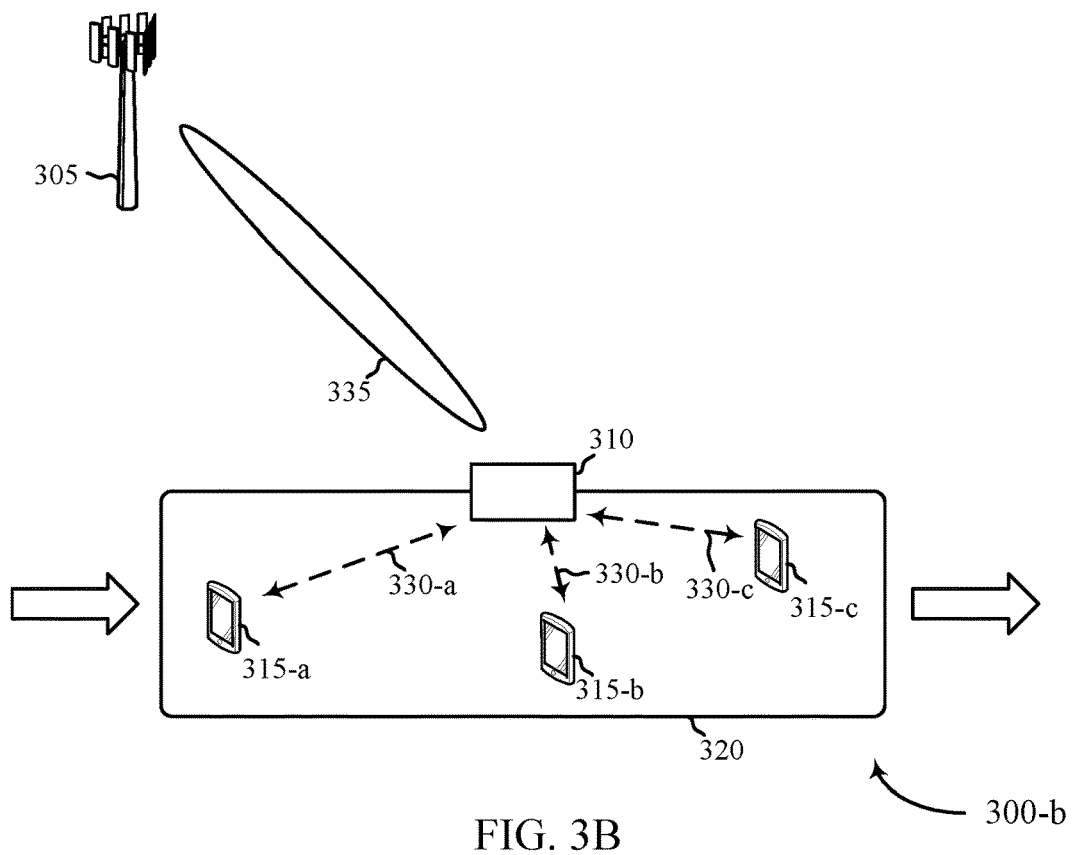

FIGS. 3A and 3B illustrate examples of a system for wireless communication that supports uplink transmissions in accordance with various aspects of the present disclosure. In some examples, wireless communications system 300 may implement aspects of wireless communications systems 100 and/or 200. Wireless communications system 300 may include a base station 305, a relay UE 310, and UEs 315, which may be examples of the corresponding devices described herein. Generally, wireless communications system 300-a illustrates an example where relay UE 310 is located proximate to base station 305 and wireless communications system 300-b illustrates an example where relay UE 310 is located farther from base station 305.

Generally, base station 305 and relay UE 310 may communicate using beamformed signal 325 (as illustrated in FIG. 3A) and using beamformed signal 335 (as illustrated in FIG. 3B). As discussed with respect to wireless communications system 200, relay UE 310 may be mounted in vehicle 320, which may be an example of an automobile, a train, a bus, a plane, a ship, etc. UEs 315 may be positioned within vehicle 320 and relay UE 310 may provide a link between UEs 315 and base station 305. UEs 315 may communicate with relay UE 310 using wireless links 330, e.g., cellular wireless links, Wi-Fi wireless links, Bluetooth wireless links, and the like. Base station 305 may be connected to a core network directly and/or via a wireless link to another base station, such as shown in FIG. 2.

In some aspects, vehicle 320 may be mobile and move along the direction indicated by the arrows. Accordingly, the position of relay UE 310 with respect to base station 305 may change over time. As the position and/or orientation of vehicle 320 (and relay UE 310 by extension) changes, the beam configuration used for communications between base station 305 and relay UE 310 may also change. For example, and as is shown in FIG. 3A, the beam configuration of beamformed signal 325 may have a relatively short propagation RTT, may have a relatively direct departure angle, may have a lower beam transmit power, and the like. Conversely and as is shown in FIG. 3B, the beam configuration of beamformed signal 335 may have a relatively longer propagation RTT, may have a higher angle of departure, may have a higher beam transmit power, and the like.

In some aspects, base station 305 may know the maximum propagation RTT for associated UE(s), such as relay UE 310. The maximum propagation RTT may include a maximum amount of time it takes for a downlink message to propagate from base station 305 to relay UE 310, for relay UE 310 to process the downlink message and transmit a responsive uplink message, and a maximum amount of time it takes for the uplink message to propagate to base station 305. Thus, the maximum propagation RTT may represent a maximum RTT for signal propagation between base station 305 and any UE within the coverage area of base station 305. Base station 305 may know the maximum propagation RTT based on previous communications (e.g., beamformed signals communicated within a defined time period), based on an active beam configuration for the beamformed signals 225/335, and the like.

Base station 305 and/or relay UE 310 may be configured to use the maximum propagation RTT and a size of an uplink message to identify a time window used for the uplink message. The time window may be used in lieu of a timing advance procedure being used to establish a timing advance value for relay UE 310. For example, base station 305 may transmit a downlink message to relay UE 310. The downlink message may be a control and/or data message. The downlink message may be transmitting using a beam configuration that is based, at least in certain aspects, on the location/orientation of base station 305 with respect to relay UE 310. Relay UE 310 being located close to base station 305 may have an associated propagation RTT that is shorter than when relay UE 310 is farther away from base station 305. In some examples, the maximum propagation RTT may be represented as variable maxRTT.

The uplink message may be scheduled for relay UE 310. The uplink message may be a message that is sent in response to the downlink message and/or may be unrelated to the downlink message. The uplink message may have an associated size, e.g., a frame size, that is based on the amount of information to be communicated in the uplink message, on the modulation and coding scheme (MCS) to be used for the uplink message, and the like. The base station 305 and relay UE 310 may know the size the uplink message. In some examples, the size of the uplink message may be represented as variable T.

In some aspects, an error tolerance metric may also be determined or otherwise identified by base station 305 and/or relay UE 310. The error tolerance metric may be a time value associated with a confidence value of the maximum propagation RTT determined by base station 305 and/or relay UE 310. In some examples, the error tolerance metric may be represented by the variable $\varepsilon$.

In some aspects, base station 305 may transmit the downlink message to relay UE 310 and then allocate a receive time window that is associated with receiving the uplink message from the relay UE 310 responsive to the downlink message. The receive time window may be allocated based on the maximum propagation RTT and the frame size of the uplink message. The receive time window may optionally be allocated based on the error tolerance metric. In some aspects, base station 305 may allocate the receive time window using the formula maxRTT+T+$\varepsilon$=receive time window. As discussed above, certain deployment scenarios may be used in environments where a maximum propagation RTT of relay UEs within a coverage area of a base station is small enough so as to not result in significant communication delays. For example, the base stations may be positioned along a train route such that a linear density of the base stations along the train route facilitates relatively small maximum propagation RTTs for UEs associated with the trains. Additionally or alternatively, the receive time window may be allocated based on the relay UE 310 being in a high-mobility state, e.g., traveling on a high-speed rail. Base station 305 may then monitor for the uplink message during the receive time window.

Relay UE 310 may receive the downlink message from base station 305 and then identify a transmit time window. The transmit time window may be allocated for the uplink message responsive to the downlink message. Broadly, the transmit time window may be a time period in which the relay UE 310 may transmit the uplink message such that it arrives at base station 305 during the receive time window. The transmit time window may be identified based on the maximum propagation RTT and the size (e.g., frame size) of the uplink message. In some aspects, the relay UE 310 may identify the transmit time window based on the error tolerance metric.

In some aspects, the transmit time window may overlap, at least to some degree, the receive time window allocated by base station 305. In some examples, the transmit time window may be offset (e.g., begin before) the receive time window by the propagation time associated with transmissions from relay UE 310 to base station 305. In some aspects, the transmit time window and the receive time window may overlap, at least to some degree, when considering the base station 305 timeline and the UE 310 timeline. In some aspects, the transmit time window may not overlap the receive time window when looking at the base station 305 timeline or the UE 310 timeline individually.

Relay UE 310 may transmit the uplink message during the transmit time window to ensure that base station 305 receives the uplink message during the receive time window. In some examples, the uplink message is transmitted immediately after receiving the downlink message, e.g., the transmit time window begins immediately after the downlink message is received.

In some examples, the downlink and/or uplink messages may carry or otherwise convey an indication of a timing parameter. The timing parameter may be associated with the respective message, e.g., the uplink message may indicate a timing parameter associated with the uplink message and the downlink message may indicate a timing parameter associated with the downlink message. The timing parameter may be absolute (e.g., associated with a fixed time) and/or may be relative (e.g., associated with reference to a common timing source). The timing parameter may be indicated in a preamble portion of the respective downlink and/or uplink message, e.g., configured in a reference signal, a synchronization signal, in a beam refinement signal, and the like. The timing parameter may be used by the base station 305 (with respect to the uplink message) and/or the relay UE 310 (with respect to the downlink message) to allocate or otherwise identify the receive time window/transmit time window, respectively.

As the described techniques omit the conventional timing advance procedure, relay UE 310 may transmit (and base station 305 may receive) the uplink message without first applying a timing advance in connection with the uplink message.

Figure 4:
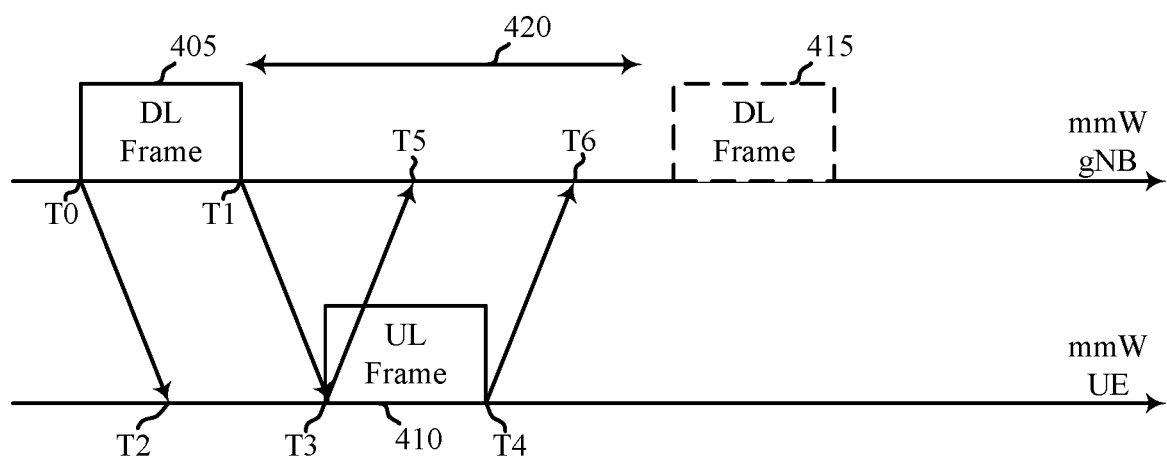
FIG. 4 illustrates an example of a timing diagram that supports uplink transmissions in accordance with aspects of the present disclosure.

FIG. 4 illustrates an example of a timing diagram 400 that supports uplink transmissions in accordance with various aspects of the present disclosure. In some examples, timing diagram 400 may implement aspects of wireless communications systems 100, 200 and/or 300. Aspects of timing diagram 400 may be implemented by a base station and/or a relay UE (such as a relay mmW UE), which may be examples of the corresponding devices described herein. Generally, timing diagram 400 illustrates an example of an uplink message transmission between a base station (e.g., mmW gNB) and a relay UE (e.g., a mmW UE), in accordance with aspects of the present disclosure.

In some aspects, timing diagram 400 may include a downlink frame 405 (e.g., a downlink message), an uplink frame 410 (e.g., an uplink message), and an optional second downlink frame 415. The downlink frame 405 may be transmitted by a base station, such as a mmW gNB, to a relay UE, such as a mmW UE. The base station may begin transmitting downlink frame 405 at time T0 and complete the transmission at time T1. However, there may be a propagation delay between the base station and the relay UE such that the downlink frame 405 is received at the relay UE beginning at time T2 and ending at time T3. The propagation delay between the base station and the relay UE may include a portion of the maximum propagation RTT.

In some aspects, the base station may allocate a receive time window 420 associated with receiving uplink frame 410 transmitted in response to downlink frame 405. The receive time window 420 may be allocated based on the maximum propagation RTT and the size of the uplink frame 410. The receive time window 420 may be allocated based on an error tolerance metric. In some aspects, a previous uplink frame may include a timing parameter indication, e.g., when the previous uplink frame was transmitted, and the base station may use the timing parameter indication when allocating the receive time window 420.

In some aspects, the downlink frame 405 may be configured to carry or otherwise indicate a timing parameter. For example, the base station may configure a preamble portion of the downlink frame 405, such as a reference signal, synchronization signal, and/or a beam refinement signal, to indicate the timing parameter. The timing parameter may be associated with the downlink frame 405, e.g., may indicate when the downlink frame 405 was transmitted.

The relay UE may receive the downlink frame 405 and identify a transmit time window allocated for transmission of uplink frame 410 responsive to downlink frame 405. The transmit time window may be allocated based on the maximum propagation RTT and the size of the uplink frame 410. The relay UE may then transmit the uplink frame 410. The uplink frame 410 may begin transmission at time T3 and end transmission at time T4. However, there may be a propagation delay between the base station and the relay UE such that the uplink frame 410 is received at the base station beginning at time T5 and ending at time T6. The propagation delay between the relay UE and the base station may be a part of the maximum propagation RTT. The time period between time T5 and T6, i.e., when the uplink frame 410 is received at the base station, is included in the receive time window 420 such that the base station can receive the uplink frame 410. In some aspects, the transmit time window may include the relay UE transmitting the uplink frame 410 immediately after the downlink frame 405 is received, e.g., at time T3. In other aspects, the transmit time window may include a short delay before the relay UE transmits the uplink frame 410, e.g., to allow time for the relay UE to process the downlink frame 405, reconfigure from receive to transmit operations, and the like. Accordingly, there may be a gap period (not shown) between when the downlink frame 405 transmission ends at T3 and before the uplink frame 410 begins transmission. The receive time window 420 may be allocated such that the uplink frame 410 is received during the receive time window 420. The base station may then transmit the second downlink frame 415, provided there is downlink information to communicate. Accordingly, the uplink frame 410 may be received without a timing advance procedure being performed between the base station and the relay UE.

In some aspects, the uplink frame 410 may be configured to carry or otherwise indicate a timing parameter. For example, a preamble portion of the uplink frame 410, such as a reference signal, synchronization signal, and/or a beam refinement signal may be configured to indicate the timing parameter. The timing parameter may be associated with the uplink frame 410, e.g., may indicate when the uplink frame 410 was transmitted.

Figure 5:
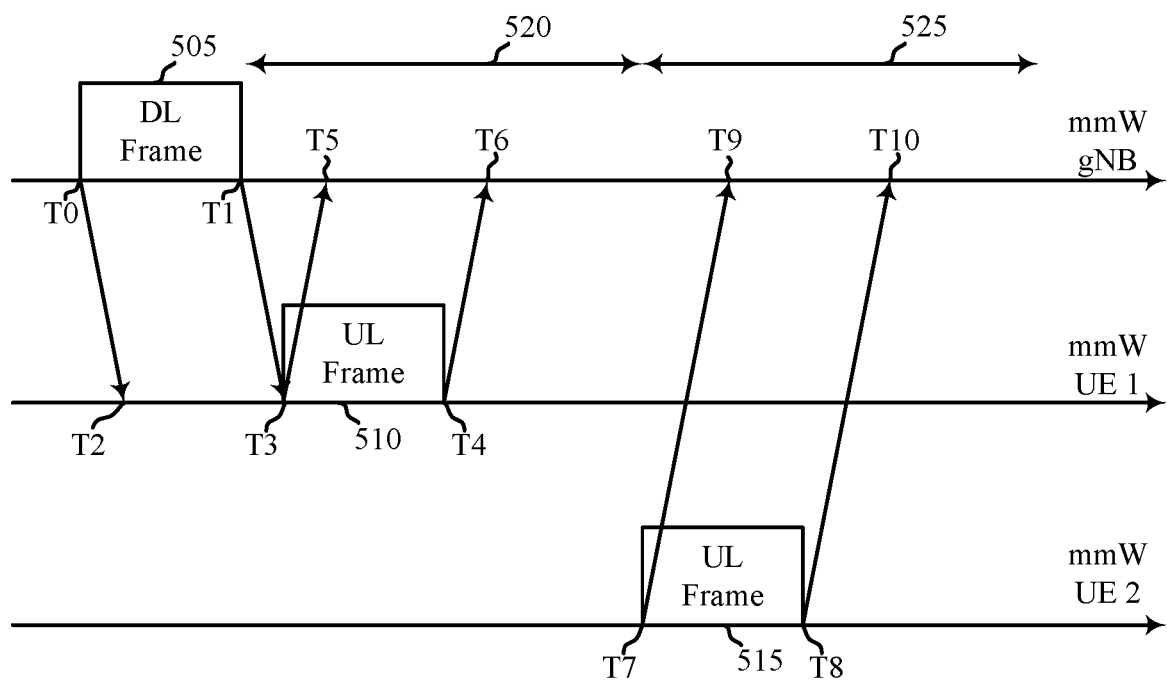
FIG. 5 illustrates an example of a timing diagram that supports uplink transmissions in accordance with aspects of the present disclosure.

FIG. 5 illustrates an example of a timing diagram 500 that supports uplink transmissions in accordance with various aspects of the present disclosure. In some examples, timing diagram 500 may implement aspects of wireless communications system 100/200/300 and/or timing diagram 400. Aspects of timing diagram 500 may be implemented by a base station and/or a relay UE (such as a relay mmW UE), which may be examples of the corresponding devices described herein. Generally, timing diagram 500 illustrates an example of an uplink message transmission between a base station (e.g., mmW gNB) and two relay UEs (e.g., mmW UEs), in accordance with aspects of the present disclosure.

In some aspects, timing diagram 500 may include a downlink frame 505 (e.g., a downlink message), an uplink frame 510 (e.g., an uplink message) from relay UE1, and an uplink frame 515 (e.g., an uplink message) from relay UE2. The downlink frame 505 may be transmitted by a base station, such as a mmW gNB, to a relay UE1, such as a mmW UE. The base station may begin transmitting downlink frame 505 at time T0 and complete the transmission at time T1. However, there may be a propagation delay between the base station and the relay UE1 such that the downlink frame 505 is received at the relay UE beginning at time T2 and ending at time T3. The propagation delay between the base station and the relay UE may include a portion of the maximum propagation RTT.

In some aspects, the base station may allocate a first receive time window 520 associated with receiving uplink frame 510 transmitted in response to downlink frame 505. The first receive time window 520 may be allocated based on the maximum propagation RTT and the size of the uplink frame 510. The first receive time window 520 may be allocated based on an error tolerance metric. In some aspects, a previous uplink frame may include a timing parameter indication, e.g., when the previous uplink frame from relay UE1 was transmitted, and the base station may use the timing parameter indication when allocating the first receive time window 520.

In some aspects, the base station may allocate a second receive time window 525 associated with receiving uplink frame 515 from relay UE2. The second receive time window 525 may be allocated based on the maximum propagation RTT and the size of the uplink frame 515. The second receive time window 525 may be allocated based on an error tolerance metric. In some aspects, a previous uplink frame from relay UE2 may include a timing parameter indication, e.g., when the previous uplink frame was transmitted, and the base station may use the timing parameter indication when allocating the second receive time window 525.

The relay UE1 may receive the downlink frame 505 and identify a transmit time window allocated for transmission of uplink frame 510 responsive to downlink frame 505. The transmit time window may be allocated based on the maximum propagation RTT and the size of the uplink frame 510. The relay UE1 may then transmit the uplink frame 510. The uplink frame 510 may begin transmission at time T3 and end transmission at time T4. However, there may be a propagation delay between the base station and the relay UE1 such that the uplink frame 510 is received at the base station beginning at time T5 and ending at time T6. The propagation delay between the relay UE1 and the base station may be a part of the maximum propagation RTT. The time period between time T5 and T6, i.e., when the uplink frame 510 is received at the base station, is included in the first receive time window 520 such that the base station can receive the uplink frame 510.

The relay UE2 may not receive the downlink frame 505, but may instead determine that an uplink frame is to be transmitted. Accordingly, the relay UE2 may also identify a transmit time window allocated for transmission of uplink frame 515 from relay UE2. The transmit time window may be allocated based on the maximum propagation RTT and the size of the uplink frame 515. The relay UE2 may then transmit the uplink frame 515. The uplink frame 515 may begin transmission at time T7 and end transmission at time T8. However, there may be a propagation delay between the base station and the relay UE2 such that the uplink frame 515 is received at the base station beginning at time T9 and ending at time T10. The propagation delay between the relay UE1 and the base station may be a part of the maximum propagation RTT. The time period between time T9 and T10, i.e., when the uplink frame 515 is received at the base station, is included in the second receive time window 525 such that the base station can receive the uplink frame 515. Accordingly, the uplink frames 510 and 515 may be received without a timing advance procedure being performed between the base station and the relay UE1 and/or relay UE2.

In some aspects, the downlink frame 505 transmitted from the base station to relay UE1 may serve as a source of timing synchronization for relay UE2. However, in other examples relay UE2 may not receive the downlink frame 505. Instead, there may be other signals, e.g., synchronization signal blocks, that relay UE2 can use for a reference for timing their uplink frame transmission.

Figure 6:
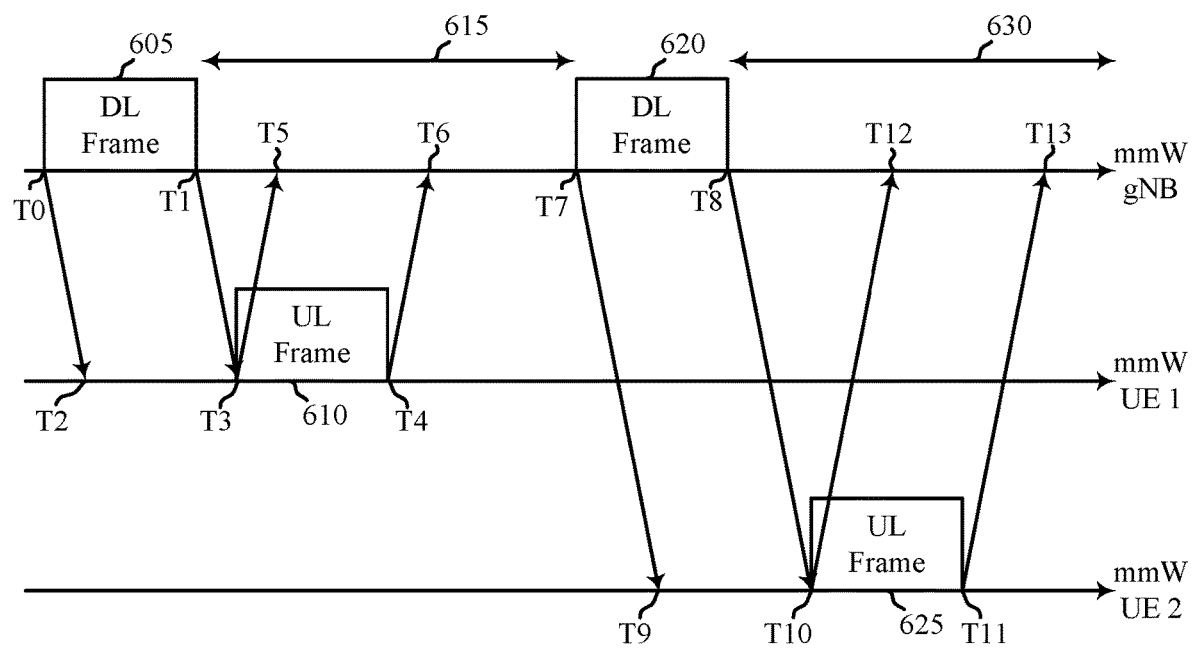
FIG. 6 illustrates an example of a timing diagram that supports uplink transmissions in accordance with aspects of the present disclosure.

FIG. 6 illustrates an example of a timing diagram 600 that supports uplink transmissions in accordance with various aspects of the present disclosure. In some examples, timing diagram 600 may implement aspects of wireless communications system 100/200/300 and/or timing diagrams 400/500. Aspects of timing diagram 600 may be implemented by a base station and/or a relay UE (such as a relay mmW UE), which may be examples of the corresponding devices described herein. Generally, timing diagram 600 illustrates an example of an uplink message transmission between a base station (e.g., mmW gNB) and two relay UEs (e.g., mmW UEs), in accordance with aspects of the present disclosure.

In some aspects, timing diagram 600 may include a downlink frame 605 (e.g., a downlink message to relay UE1), an uplink frame 610 (e.g., an uplink message from relay UE1), a downlink frame 620 (e.g., a downlink message for relay UE2), and an uplink frame 625 (e.g., an uplink message from relay UE2). The downlink frame 605 may be transmitted by a base station, such as a mmW gNB, to a relay UE1, such as a mmW UE. The base station may begin transmitting downlink frame 605 at time T0 and complete the transmission at time T1. However, there may be a propagation delay between the base station and the relay UE1 such that the downlink frame 605 is received at the relay UE1 beginning at time T2 and ending at time T3. The propagation delay between the base station and the relay UE1 may include a portion of the maximum propagation RTT.

In some aspects, the base station may allocate a receive time window 615 associated with receiving uplink frame 610 transmitted from relay UE1 in response to downlink frame 605. The receive time window 615 may be allocated based on the maximum propagation RTT and the size of the uplink frame 610. The receive time window 615 may be allocated based on an error tolerance metric.

Relay UE1 may receive the downlink frame 605 and identify a transmit time window allocated for transmission of uplink frame 610 responsive to downlink frame 605. The transmit time window may be allocated based on the maximum propagation RTT and the size of the uplink frame 610. The relay UE1 may then transmit the uplink frame 610. The uplink frame 610 may begin transmission at time T3 and end transmission at time T4. However, there may be a propagation delay between the base station and the relay UE1 such that the uplink frame 610 is received at the base station beginning at time T5 and ending at time T6. The propagation delay between the relay UE1 and the base station may be a part of the maximum propagation RTT. The time period between time T5 and T6, i.e., when the uplink frame 610 is received at the base station, is included in the receive time window 615 such that the base station can receive the uplink frame 610.

The downlink frame 620 may be transmitted by a base station, such as a mmW gNB, to a relay UE2, such as a mmW UE. The base station may begin transmitting downlink frame 620 at time T7 and complete the transmission at time T8. However, there may be a propagation delay between the base station and the relay UE2 such that the downlink frame 620 is received at the relay UE2 beginning at time T9 and ending at time T10. The propagation delay between the base station and the relay UE2 may include a portion of the maximum propagation RTT.

In some aspects, the base station may allocate a receive time window 630 associated with receiving uplink frame 625 transmitted from relay UE2 in response to downlink frame 620. The receive time window 630 may be allocated based on the maximum propagation RTT and the size of the uplink frame 625. The receive time window 630 may be allocated based on an error tolerance metric.

Relay UE2 may receive the downlink frame 620 and identify a transmit time window allocated for transmission of uplink frame 625 responsive to downlink frame 620. The transmit time window may be allocated based on the maximum propagation RTT and the size of the uplink frame 625. The relay UE2 may then transmit the uplink frame 625. The uplink frame 625 may begin transmission at time T10 and end transmission at time T11. However, there may be a propagation delay between the base station and the relay UE2 such that the uplink frame 625 is received at the base station beginning at time T12 and ending at time T13. The propagation delay between the relay UE2 and the base station may be a part of the maximum propagation RTT. The time period between time T12 and T13, i.e., when the uplink frame 625 is received at the base station, is included in the receive time window 630 such that the base station can receive the uplink frame 625.

Accordingly, the uplink frames 610 and 625 may be received without a timing advance procedure being performed between the base station and the relay UE1 and/or relay UE2.

Figure 7:
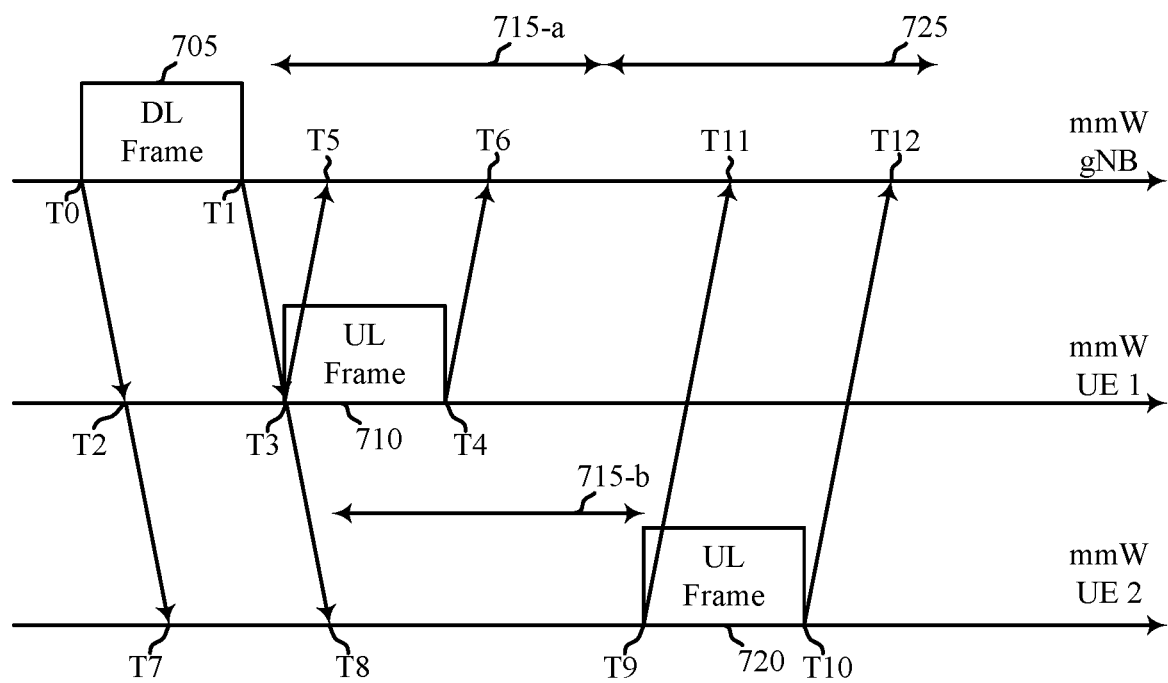
FIG. 7 illustrates an example of a timing diagram that supports uplink transmissions in accordance with aspects of the present disclosure.

FIG. 7 illustrates an example of a timing diagram 700 that supports uplink transmissions in accordance with various aspects of the present disclosure. In some examples, timing diagram 700 may implement aspects of wireless communications system 100/200/300 and/or timing diagrams 400/500/600. Aspects of timing diagram 700 may be implemented by a base station and/or a relay UE (such as a relay mmW UE), which may be examples of the corresponding devices described herein. Generally, timing diagram 700 illustrates an example of an uplink message transmission between a base station (e.g., mmW gNB) and two relay UEs (e.g., mmW UEs), in accordance with aspects of the present disclosure.

In some aspects, timing diagram 700 may include a downlink frame 705 (e.g., a downlink message to relay UE1), an uplink frame 710 (e.g., an uplink message from relay UE1), and an uplink frame 720 (e.g., an uplink message from relay UE2). The downlink frame 705 may be transmitted by a base station, such as a mmW gNB, to a relay UE1, such as a mmW UE. The base station may begin transmitting downlink frame 705 at time T0 and complete the transmission at time T1. However, there may be a propagation delay between the base station and the relay UE1 such that the downlink frame 705 is received at the relay UE1 beginning at time T2 and ending at time T3. The propagation delay between the base station and the relay UE may include a portion of the maximum propagation RTT.

In some aspects, the downlink frame 705 transmitted from the base station to relay UE1 may serve as a source of timing synchronization for relay UE2. There may be a propagation delay between the base station and the relay UE2 such that the downlink frame 705 is received at the relay UE2 beginning at time T7 and ending at time T8. The relay UE2 may receive the downlink frame 705 and identify a timing parameter indicated in the downlink frame 705, e.g., when the downlink frame 705 was transmitted.

In some aspects, the base station may allocate a first receive time window 715 associated with receiving uplink frame 710 transmitted from relay UE1 in response to downlink frame 705. The first receive time window 715 may be allocated based on the maximum propagation RTT and the size of the uplink frame 710. The first receive time window 715 may be allocated based on an error tolerance metric. In some aspects, a previous uplink frame may include a timing parameter indication, e.g., when the previous uplink frame from relay UE1 was transmitted, and the base station may use the timing parameter indication when allocating the first receive time window 715.

In some aspects, the base station may allocate a second receive time window 725 associated with receiving uplink frame 720 from relay UE2. The second receive time window 725 may be allocated based on the maximum propagation RTT and the size of the uplink frame 720. The second receive time window 725 may be allocated based on an error tolerance metric. In some aspects, a previous uplink frame from relay UE2 may include a timing parameter indication, e.g., when the previous uplink frame was transmitted, and the base station may use the timing parameter indication when allocating the second receive time window 725.

The relay UE1 may receive the downlink frame 705 and identify a transmit time window allocated for transmission of uplink frame 710 responsive to downlink frame 705. The transmit time window may be allocated based on the maximum propagation RTT and the size of the uplink frame 710. The relay UE1 may then transmit the uplink frame 710. The uplink frame 710 may begin transmission at time T3 and end transmission at time T4. However, there may be a propagation delay between the base station and the relay UE1 such that the uplink frame 710 is received at the base station beginning at time T5 and ending at time T6. The propagation delay between the relay UE1 and the base station may be a part of the maximum propagation RTT. The time period between time T5 and T6, i.e., when the uplink frame 710 is received at the base station, is included in the first receive time window 715 such that the base station can receive the uplink frame 710.

The relay UE2 may identify a transmit time window allocated for transmission of uplink frame 720 from relay UE2. The transmit time window may be allocated based on the maximum propagation RTT and the size of the uplink frame 720. The relay UE2 may then transmit the uplink frame 720. The uplink frame 720 may begin transmission at time T9 and end transmission at time T10. However, there may be a propagation delay between the base station and the relay UE2 such that the uplink frame 720 is received at the base station beginning at time T11 and ending at time T12. The propagation delay between the relay UE2 and the base station may be a part of the maximum propagation RTT. The time period between time T11 and T12, i.e., when the uplink frame 720 is received at the base station, is included in the second receive time window 725 such that the base station can receive the uplink frame 720. Accordingly, the uplink frames 710 and 720 may be received without a timing advance procedure being performed between the base station and the relay UE1 and/or relay UE2.

Figure 8:
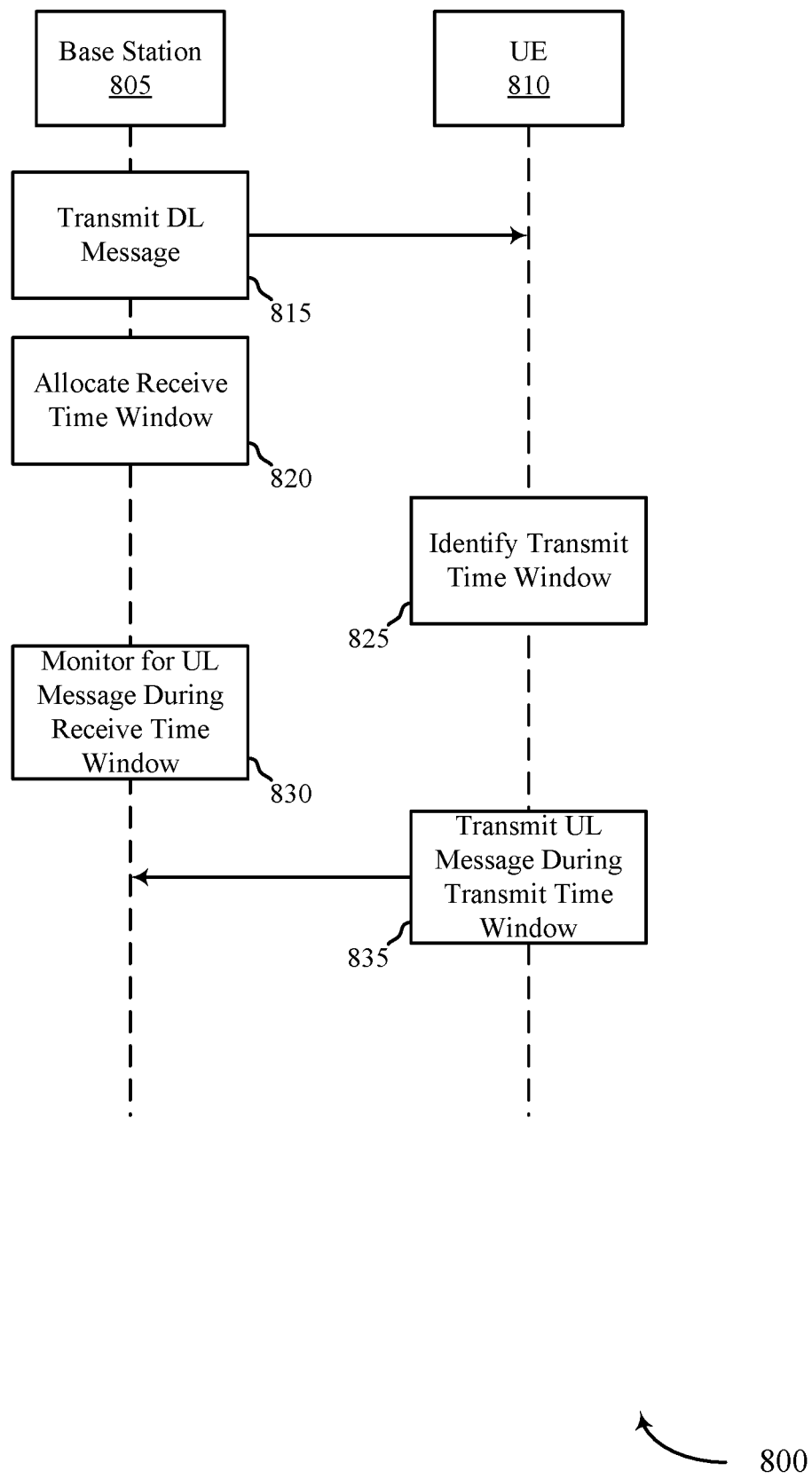
FIG. 8 illustrates an example of a process that supports uplink transmissions in accordance with aspects of the present disclosure.

FIG. 8 illustrates an example of a process 800 that supports uplink transmissions in accordance with various aspects of the present disclosure. In some examples, process 800 may implement aspects of wireless communications system 100/200/300 and/or timing diagrams 400/500/600/700. Process 800 may include a base station 805 (e.g., a mmW gNB) and a UE 810 (e.g., a mmW relay UE), which may be examples of the corresponding devices described herein.

At 815, base station 805 may transmit (and UE 810 may receive) a downlink message. The downlink message may include control and/or data information. The downlink message may be transmitted in a beamformed signal having an associated beam configuration. The beam configuration may be based on the distance/orientation of the base station 805 with respect to the UE 810. The downlink message may be transmitted to the UE 810 without a request that the UE 810 uses a timing advance. The UE 810 may receive the downlink message using a beam configuration, e.g., a receive beam associated with mmW communications.

At 820, base station 805 may allocate a receive time window associated with receiving an uplink message from the UE 810 responsive to the downlink message. The receive time window may be based, at least in certain aspects, on a maximum propagation RTT associated with UEs within the coverage area of base station 805 and on a frame size of the uplink message. The base station may identify an error tolerance metric associated with the maximum propagation RTT and allocate the receive time window based on the error tolerance metric. In some aspects, base station 805 may determine that UE 810 is operating in a high mobility state and allocate the receive time window based on the high mobility state.

In some aspects, base station 805 may configure a preamble of the downlink message to indicate a timing parameter associated with the downlink message. A preamble (or other portion of the downlink message) may include, but is not limited to, a reference signal, a synchronization signal, and/or a beam refinement signal. The receive time window may be based, at least in certain aspects, on the timing parameter.

In some aspects, base station 805 may decode a preamble of a previously received uplink message that indicates a timing parameter associated with the uplink message. A preamble (or other portion of the uplink message) may include, but is not limited to, a reference signal, a synchronization signal, and/or a beam refinement signal. The receive time window may be based, at least in certain aspects, on the timing parameter.

At 825, UE 810 may identify a transmit time window allocated for an uplink message responsive to the downlink message. The transmit time window may be allocated based at least in part on the maximum propagation RTT associated with UEs within a coverage area of base station 805 and a frame size of the uplink message. The transmit time window may be identified based, at least in certain aspects, in the downlink message. The UE 810 may identify an error tolerance metric associated with the maximum propagation RTT and identify the transmit time window based, at least in certain aspects, on the error tolerance metric.

At 830, base station 805 may monitor for the uplink message during the receive time window.

At 835, UE 810 may transmit (and base station 805 may receive) the uplink message during an initial period of the transmit time window. Accordingly, the base station 805 may receive the uplink message during the receive time window. UE 810 may transmit the uplink message using a UE transmit beam configuration, e.g., in a mmW transmission. UE 810 may transmit the uplink message without first applying a timing advance in connection with the uplink message.

In some aspects, UE 810 may configure a preamble of the uplink message to indicate a timing parameter associated with the uplink message. The preamble may include, but is not limited to, a reference signal, a synchronization signal, and/or a beam refinement signal.

Figure 9:
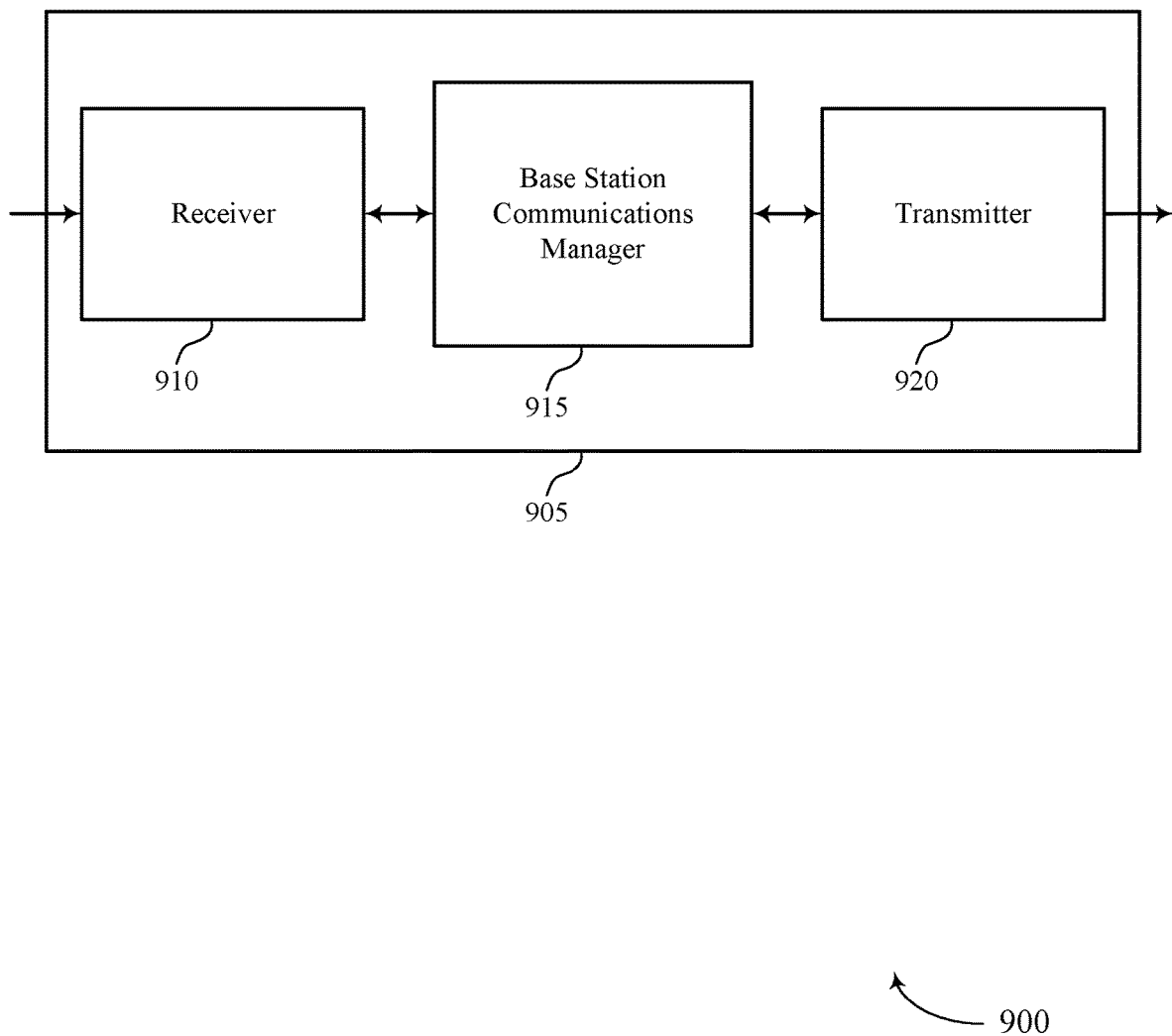
FIGS. 9 through 11 show block diagrams of a device that supports uplink transmissions in accordance with aspects of the present disclosure.

FIG. 9 shows a block diagram 900 of a wireless device 905 that supports uplink transmissions in accordance with aspects of the present disclosure. Wireless device 905 may be an example of aspects of a base station 105 as described herein, such as a mmW gNB. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to uplink transmissions without uplink timing control and measurement, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12.

Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit a downlink message to a UE, allocate a receive time window associated with receiving an uplink message from the UE responsive to the downlink message, where the receive time window is allocated based on a maximum propagation RTT associated with UEs within a coverage area of the base station and a frame size of the uplink message, monitor the receive time window for the uplink message from the UE, and receive the uplink message from the UE during the receive time window.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
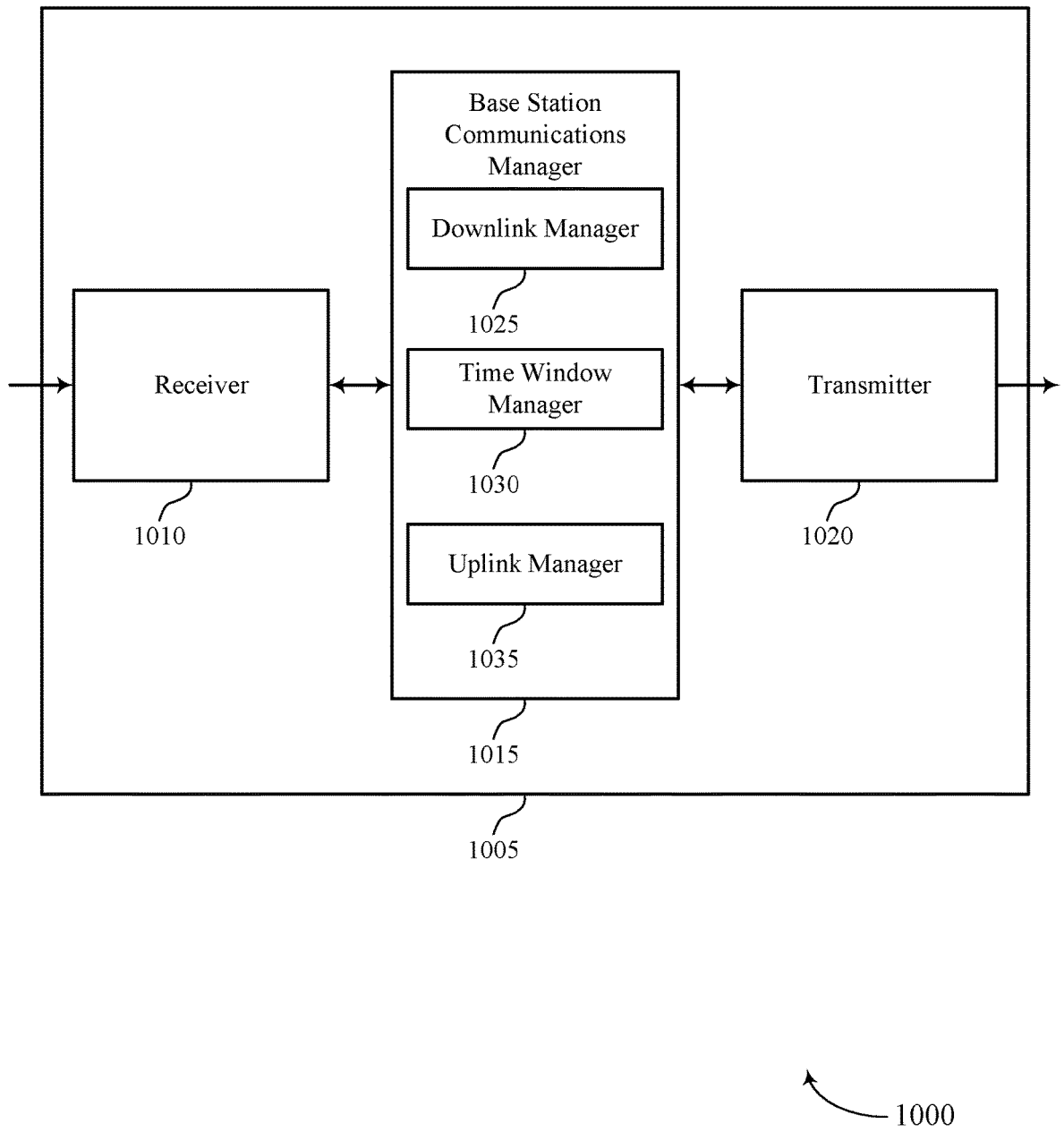

FIG. 10 shows a block diagram 1000 of a wireless device 1005 that supports uplink transmissions in accordance with aspects of the present disclosure. Wireless device 1005 may be an example of aspects of a wireless device 905 or a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to uplink transmissions without uplink timing control and measurement, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12.

Base station communications manager 1015 may also include downlink manager 1025, time window manager 1030, and uplink manager 1035.

Downlink manager 1025 may transmit a downlink message to a UE.

Time window manager 1030 may allocate a receive time window associated with receiving an uplink message from the UE responsive to the downlink message, where the receive time window is allocated based on a maximum propagation RTT associated with UEs within a coverage area of the base station and a frame size of the uplink message.

Uplink manager 1035 may monitor the receive time window for the uplink message from the UE and receive the uplink message from the UE during the receive time window.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
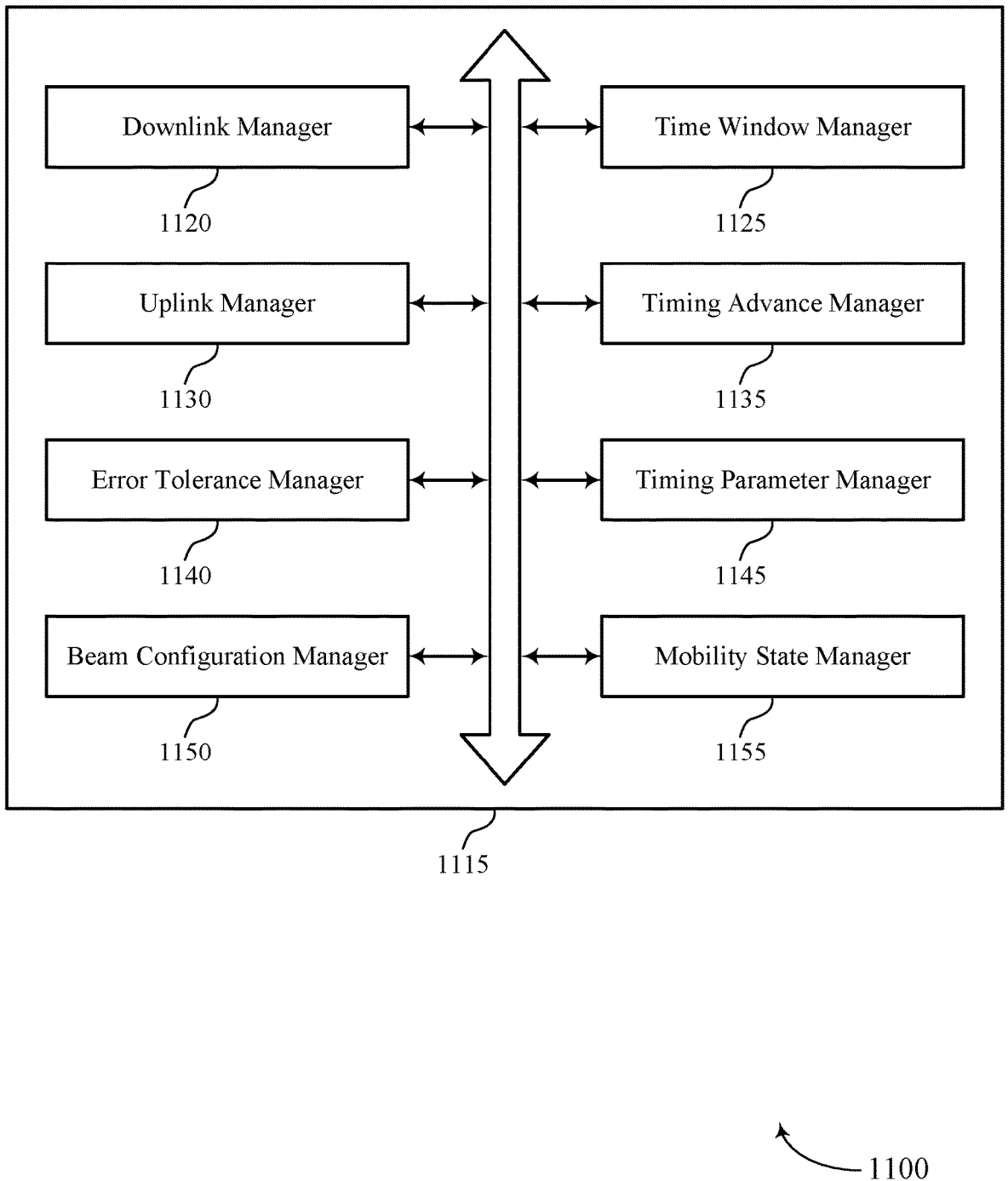

FIG. 11 shows a block diagram 1100 of a base station communications manager 1115 that supports uplink transmissions in accordance with aspects of the present disclosure. The base station communications manager 1115 may be an example of aspects of a base station communications manager 915, a base station communications manager 1015, or a base station communications manager 1215 described with reference to FIGS. 9, 10, and 12. The base station communications manager 1115 may include downlink manager 1120, time window manager 1125, uplink manager 1130, timing advance manager 1135, error tolerance manager 1140, timing parameter manager 1145, beam configuration manager 1150, and mobility state manager 1155. Each of these modules may communicate, directly or indirectly, with one another (e.g., via one or more buses).

Downlink manager 1120 may transmit a downlink message to a UE.

Time window manager 1125 may allocate a receive time window associated with receiving an uplink message from the UE responsive to the downlink message, where the receive time window is allocated based on a maximum propagation RTT associated with UEs within a coverage area of the base station and a frame size of the uplink message.

Uplink manager 1130 may monitor the receive time window for the uplink message from the UE and receive the uplink message from the UE during the receive time window.

Timing advance manager 1135 may manage aspects of transmitting the downlink message including transmitting the downlink message without a request that the UE use a timing advance in connection with the uplink message. In some cases, the receive time window is allocated based on a timing advance procedure not being performed.

Error tolerance manager 1140 may identify an error tolerance metric associated with the maximum propagation RTT, where the receive time window is allocated based on the error tolerance metric.

Timing parameter manager 1145 may configure a preamble of the downlink message to indicate a timing parameter associated with the downlink message and decode a preamble of the uplink message to identify a timing parameter associated with the uplink message, where the receive time window is allocated based on the timing parameter. In some cases, configuring the preamble includes configuring at least one of a reference signal, or a synchronization signal, or a beam refinement signal, or a combination thereof, to indicate the timing parameter. In some cases, the downlink message is transmitted during a transmit time window. In some cases, the preamble includes at least one of a reference signal, or a synchronization signal, or a beam refinement signal, or a combination thereof, to indicate the timing parameter, 12.

Beam configuration manager 1150 may receive the uplink message using a base station receive beam configuration, where the uplink message is a millimeter wave transmission.

Mobility state manager 1155 may determine that the UE is operating in a high mobility state, where the receive time window is allocated based on the high mobility state.

Figure 12:
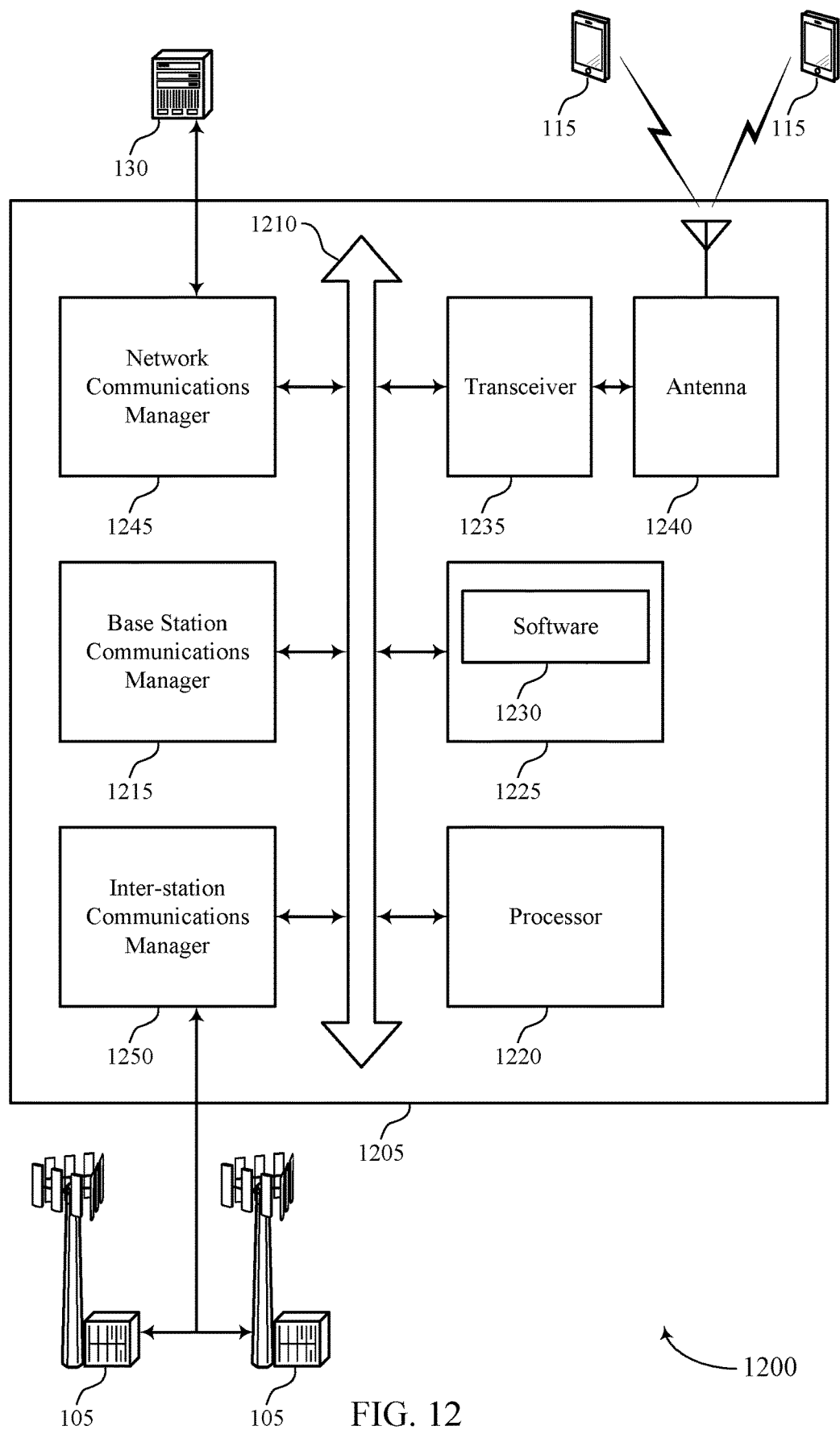
FIG. 12 illustrates a block diagram of a system including a base station that supports uplink transmissions in accordance with aspects of the present disclosure.

FIG. 12 shows a diagram of a system 1200 including a device 1205 that supports uplink transmissions in accordance with aspects of the present disclosure. Device 1205 may be an example of or include the components of wireless device 905, wireless device 1005, or a base station 105 as described herein, e.g., with reference to FIGS. 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting uplink transmissions without uplink timing control and measurement).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support uplink transmissions without uplink timing control and measurement. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
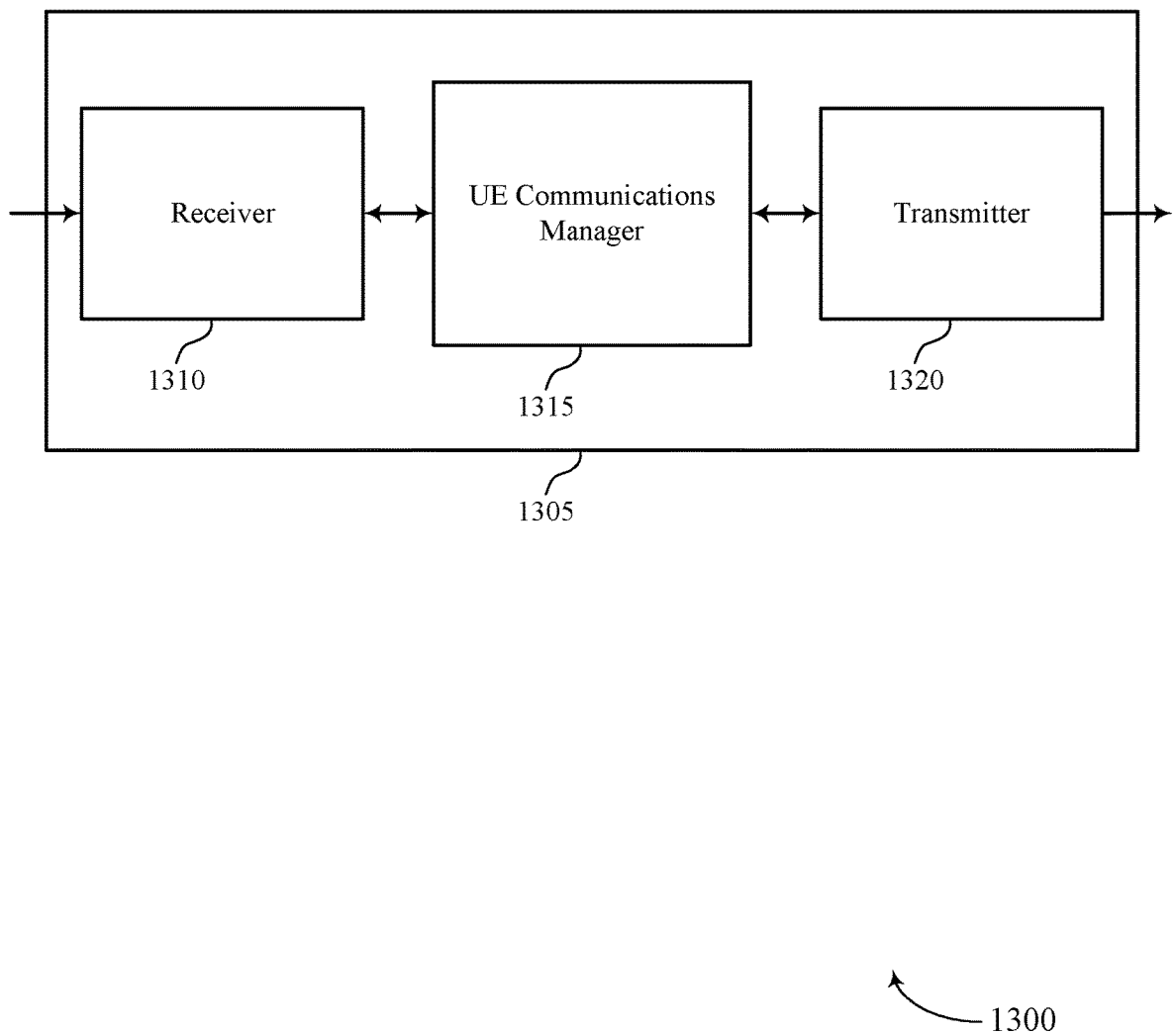
FIGS. 13 through 15 show block diagrams of a device that supports uplink transmissions in accordance with aspects of the present disclosure.

FIG. 13 shows a block diagram 1300 of a wireless device 1305 that supports uplink transmissions in accordance with aspects of the present disclosure. Wireless device 1305 may be an example of aspects of a UE 115 as described herein, such as a mmW relay UE. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to uplink transmissions without uplink timing control and measurement, etc.). Information may be passed on to other components of the device. The receiver 1310 may be an example of aspects of the transceiver 1635 described with reference to FIG. 16. The receiver 1310 may utilize a single antenna or a set of antennas.

UE communications manager 1315 may be an example of aspects of the UE communications manager 1615 described with reference to FIG. 16.

UE communications manager 1315 and/or at least some of its various sub-components may be implemented in hardware, software executed by a processor, firmware, or any combination thereof. If implemented in software executed by a processor, the functions of the UE communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1315 and/or at least some of its various sub-components may be physically located at various positions, including being distributed such that portions of functions are implemented at different physical locations by one or more physical devices. In some examples, UE communications manager 1315 and/or at least some of its various sub-components may be a separate and distinct component in accordance with various aspects of the present disclosure. In other examples, UE communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1315 may receive a downlink message from a base station, identify a transmit time window allocated for an uplink message responsive to the downlink message, where the transmit time window is allocated based on a maximum propagation RTT associated with UEs within a coverage area of the base station and a frame size of the uplink message, and transmit the uplink message to the base station during an initial period of the transmit time window.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
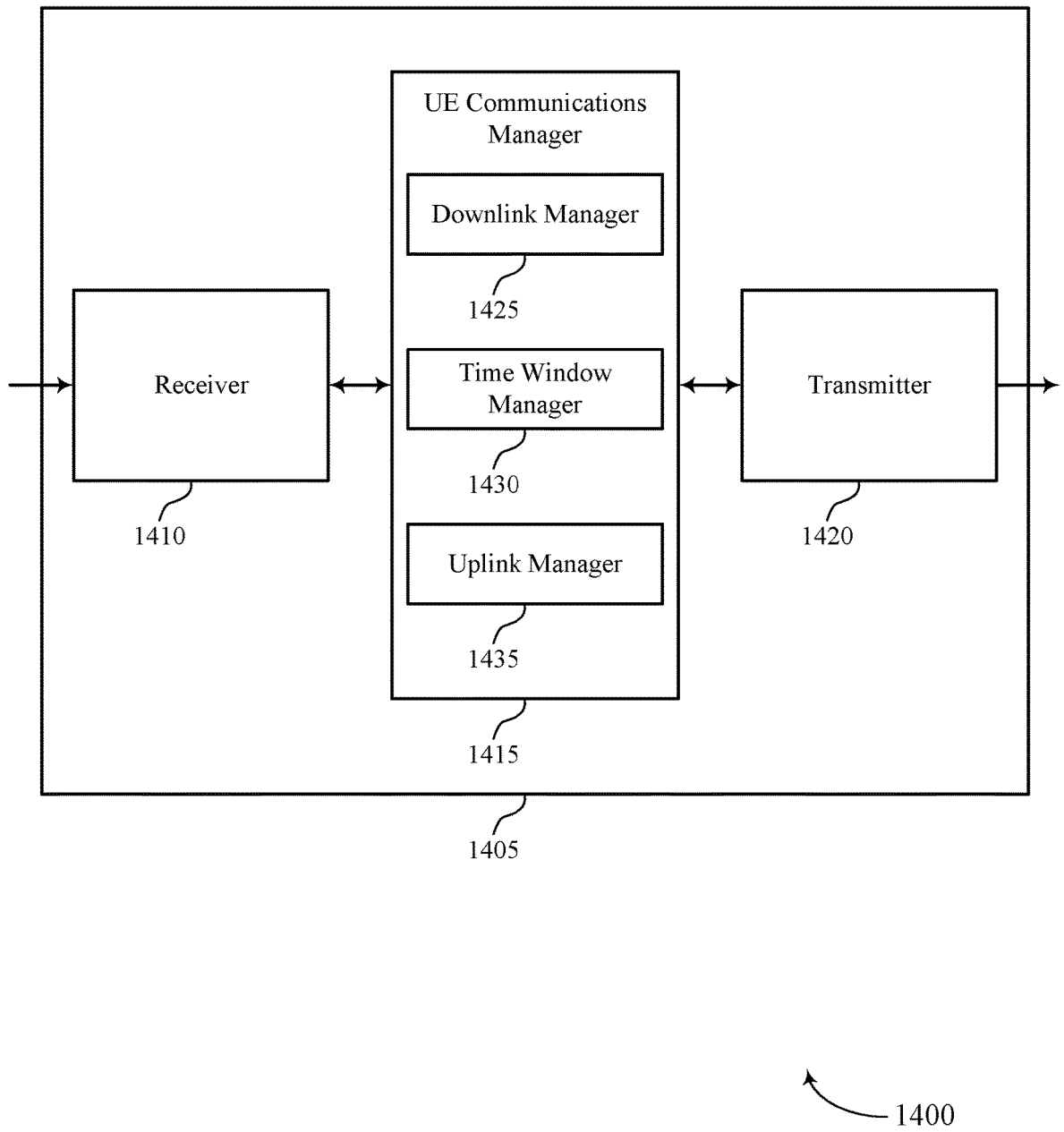

FIG. 14 shows a block diagram 1400 of a wireless device 1405 that supports uplink transmissions in accordance with aspects of the present disclosure. Wireless device 1405 may be an example of aspects of a wireless device 1305 or a UE 115 as described herein. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to uplink transmissions without uplink timing control and measurement, etc.). Information may be passed on to other components of the device. The receiver 1410 may be an example of aspects of the transceiver 1635 described with reference to FIG. 16. The receiver 1410 may utilize a single antenna or a set of antennas.

UE communications manager 1415 may be an example of aspects of the UE communications manager 1615 described with reference to FIG. 16.

UE communications manager 1415 may also include downlink manager 1425, time window manager 1430, and uplink manager 1435.

Downlink manager 1425 may receive a downlink message from a base station.

Time window manager 1430 may identify a transmit time window allocated for an uplink message responsive to the downlink message, where the transmit time window is allocated based on a maximum propagation RTT associated with UEs within a coverage area of the base station and a frame size of the uplink message. In some cases, the transmit time window is identified based on the downlink message. In some cases, the uplink message is transmitted in response to receiving the downlink message and is transmitted immediately after receiving the downlink message.

Uplink manager 1435 may transmit the uplink message to the base station during an initial period of the transmit time window.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
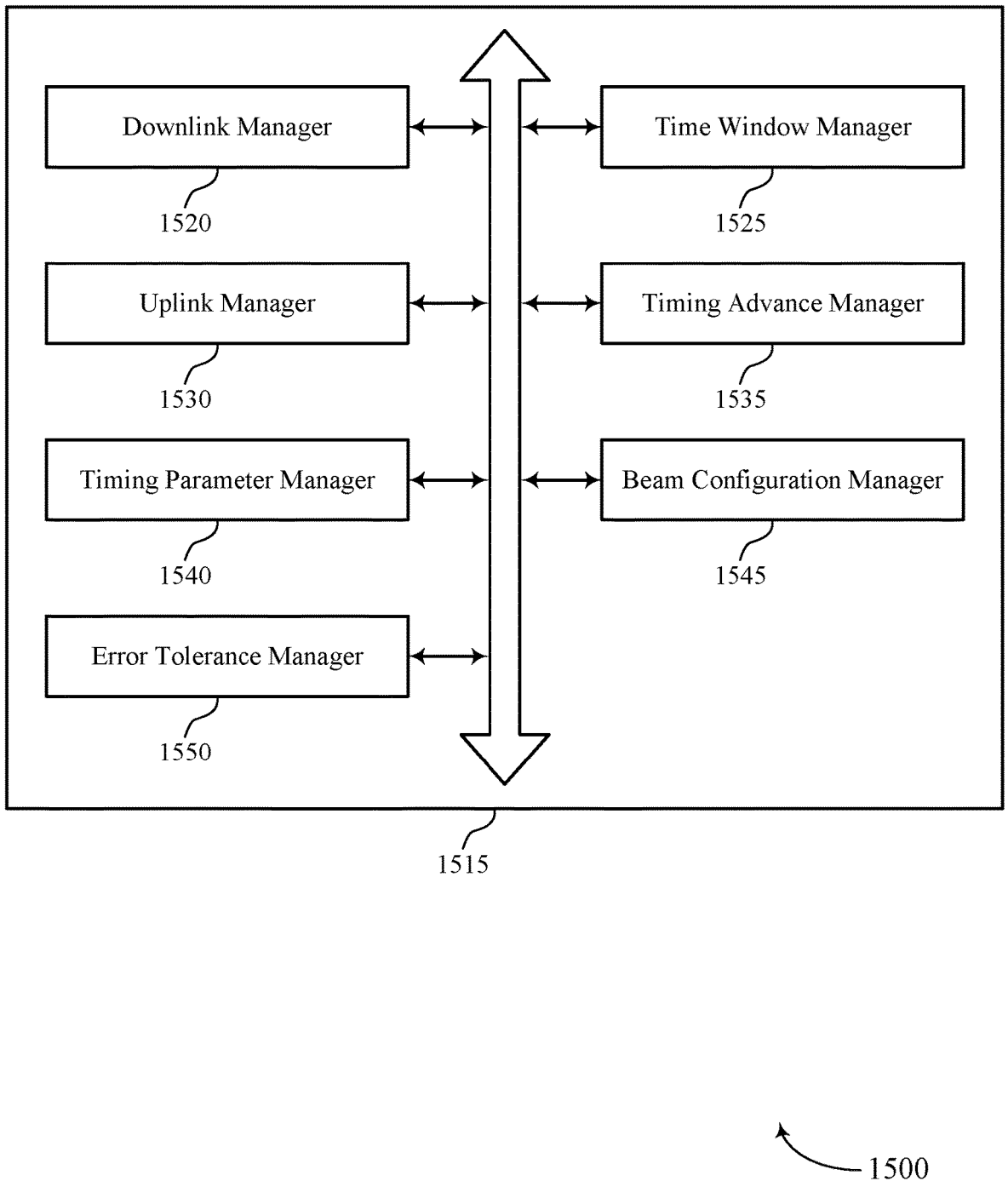

FIG. 15 shows a block diagram 1500 of a UE communications manager 1515 that supports uplink transmissions in accordance with aspects of the present disclosure. The UE communications manager 1515 may be an example of aspects of a UE communications manager 1615 described with reference to FIGS. 13, 14, and 16. The UE communications manager 1515 may include downlink manager 1520, time window manager 1525, uplink manager 1530, timing advance manager 1535, timing parameter manager 1540, beam configuration manager 1545, and error tolerance manager 1550. Each of these modules may communicate, directly or indirectly, with one another (e.g., via one or more buses).

Downlink manager 1520 may receive a downlink message from a base station.

Time window manager 1525 may identify a transmit time window allocated for an uplink message responsive to the downlink message, where the transmit time window is allocated based on a maximum propagation RTT associated with UEs within a coverage area of the base station and a frame size of the uplink message. In some cases, the transmit time window is identified based on the downlink message. In some cases, the uplink message is transmitted in response to receiving the downlink message and is transmitted immediately after receiving the downlink message.

Uplink manager 1530 may transmit the uplink message to the base station during an initial period of the transmit time window.

Timing advance manager 1535 may manage aspects of transmitting the uplink message including transmitting the uplink message without first applying a timing advance in connection with the uplink message. In some cases, the transmit time window is allocated based on a timing advance procedure not being performed.

Timing parameter manager 1540 may decode a preamble of the downlink message to identify an indication of a timing parameter associated with the downlink message and configure a preamble of the uplink message to indicate a timing parameter associated with the uplink message. In some cases, the preamble includes at least one of a reference signal, or a synchronization signal, or a beam refinement signal, or a combination thereof, indicating the timing parameter. In some cases, configuring the preamble includes configuring at least one of a reference signal, or a synchronization signal, or a beam refinement signal, or a combination thereof, to indicate the timing parameter.

Beam configuration manager 1545 may receive the downlink message using a UE receive beam configuration, where the downlink message is a millimeter wave transmission and transmit the uplink message using a UE transmit beam configuration, where the uplink message is a millimeter wave transmission.

Error tolerance manager 1550 may identify an error tolerance metric associated with the maximum propagation RTT, where the transmit time window is allocated based on the error tolerance metric.

Figure 16:
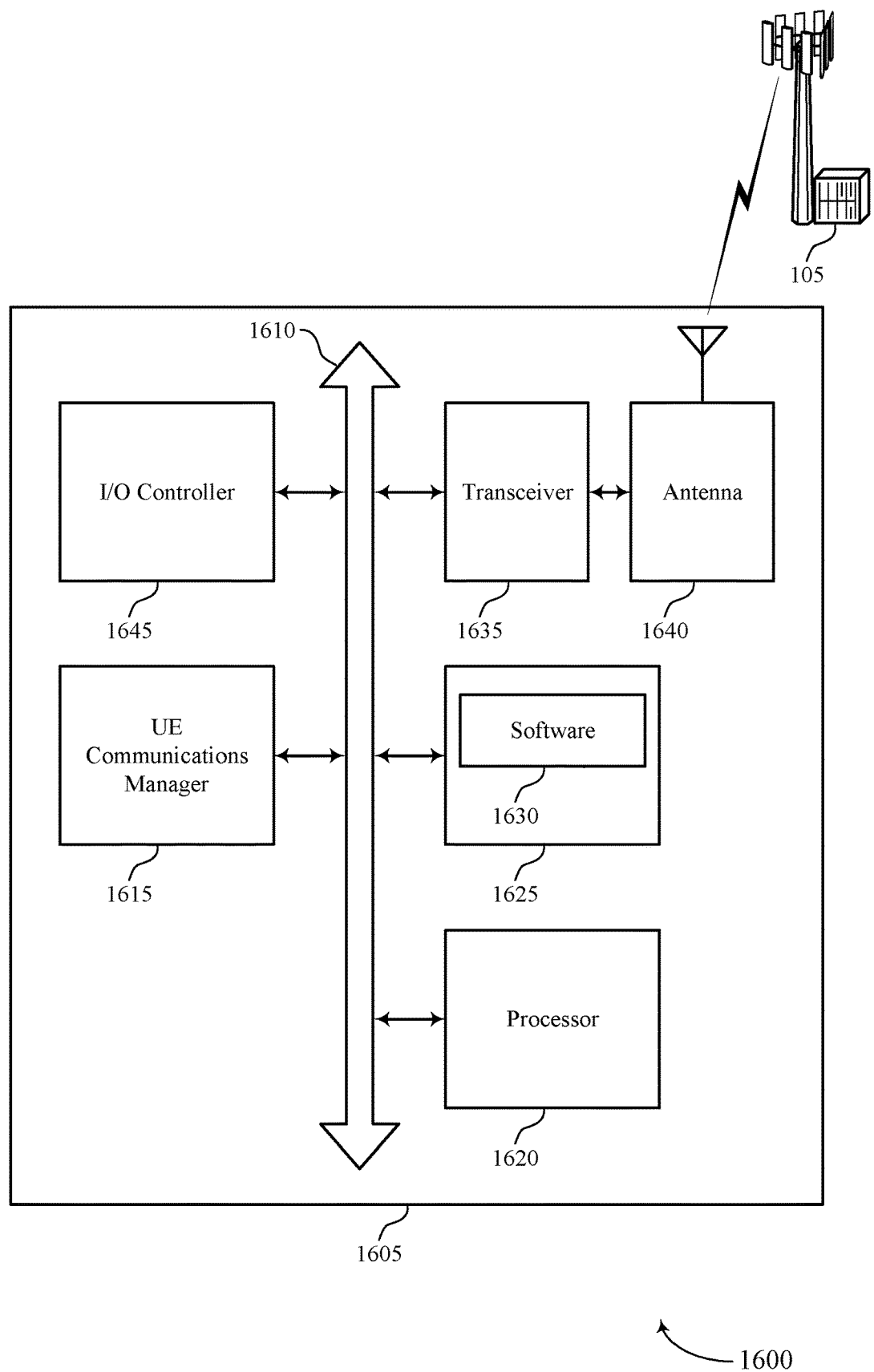
FIG. 16 illustrates a block diagram of a system including a UE that supports uplink transmissions in accordance with aspects of the present disclosure.

FIG. 16 shows a diagram of a system 1600 including a device 1605 that supports uplink transmissions in accordance with aspects of the present disclosure. Device 1605 may be an example of or include the components of UE 115 as described herein, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more buses (e.g., bus 1610). Device 1605 may communicate wirelessly with one or more base stations 105.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting uplink transmissions without uplink timing control and measurement).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support uplink transmissions without uplink timing control and measurement. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described herein. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system. In other cases, I/O controller 1645 may represent or interact with a modem, a keyboard, a mouse, a touchscreen, or a similar device. In some cases, I/O controller 1645 may be implemented as part of a processor. In some cases, a user may interact with device 1605 via I/O controller 1645 or via hardware components controlled by I/O controller 1645.

Figure 17:
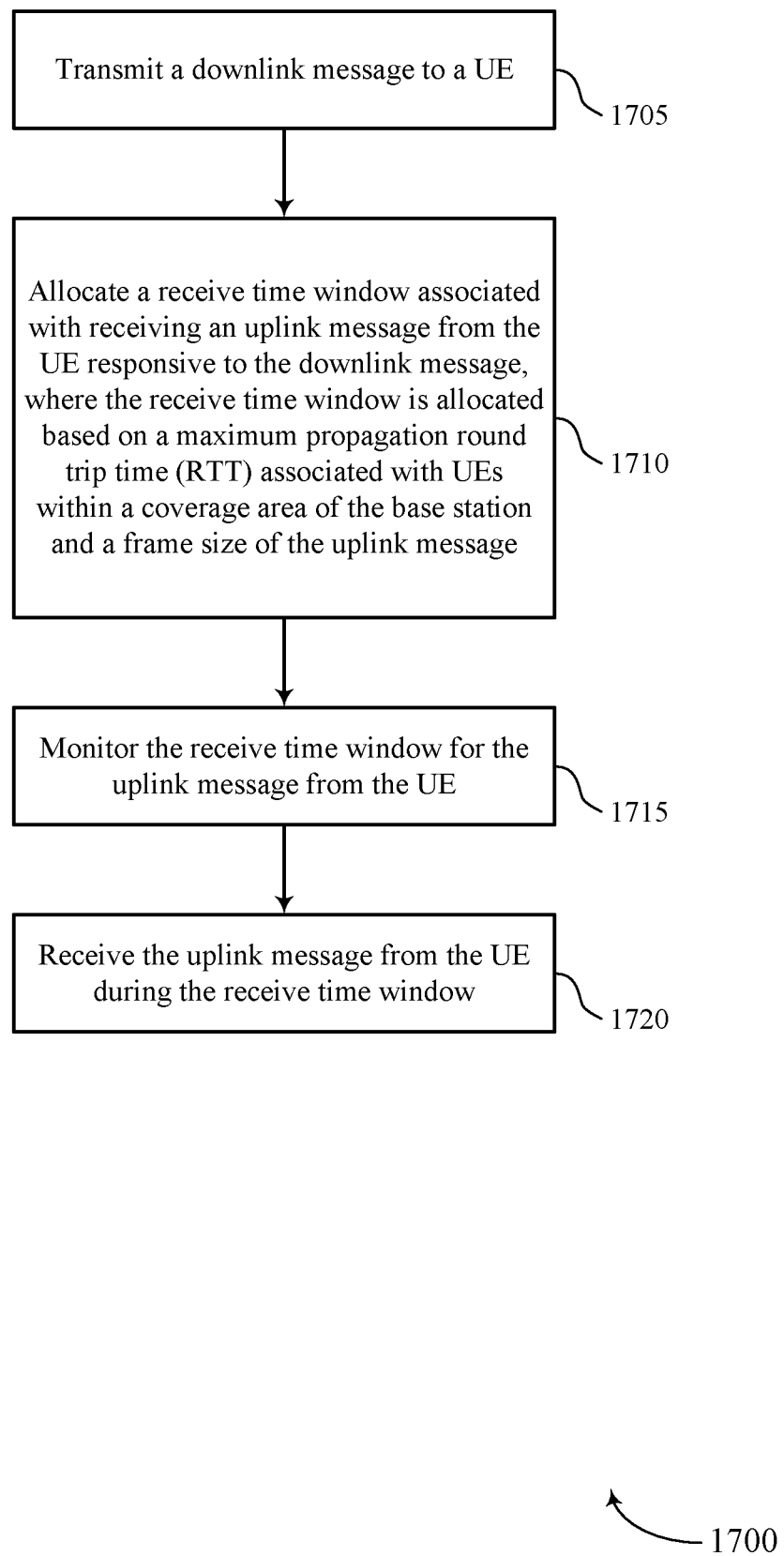
FIGS. 17 through 20 illustrate methods for uplink transmissions in accordance with aspects of the present disclosure.

FIG. 17 shows a flowchart illustrating a method 1700 for uplink transmissions in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1705 the base station 105 may transmit a downlink message to a UE. The operations of 1705 may be performed according to the methods described herein. In certain examples, aspects of the operations of 1705 may be performed by a downlink manager as described with reference to FIGS. 9 through 12.

At 1710 the base station 105 may allocate a receive time window associated with receiving an uplink message from the UE responsive to the downlink message, wherein the receive time window is allocated based at least in part on a maximum propagation RTT associated with UEs within a coverage area of the base station and a frame size of the uplink message. The operations of 1710 may be performed according to the methods described herein. In certain examples, aspects of the operations of 1710 may be performed by a time window manager as described with reference to FIGS. 9 through 12.

At 1715 the base station 105 may monitor the receive time window for the uplink message from the UE. The operations of 1715 may be performed according to the methods described herein. In certain examples, aspects of the operations of 1715 may be performed by a uplink manager as described with reference to FIGS. 9 through 12.

At 1720 the base station 105 may receive the uplink message from the UE during the receive time window. The operations of 1720 may be performed according to the methods described herein. In certain examples, aspects of the operations of 1720 may be performed by a uplink manager as described with reference to FIGS. 9 through 12.

Figure 18:
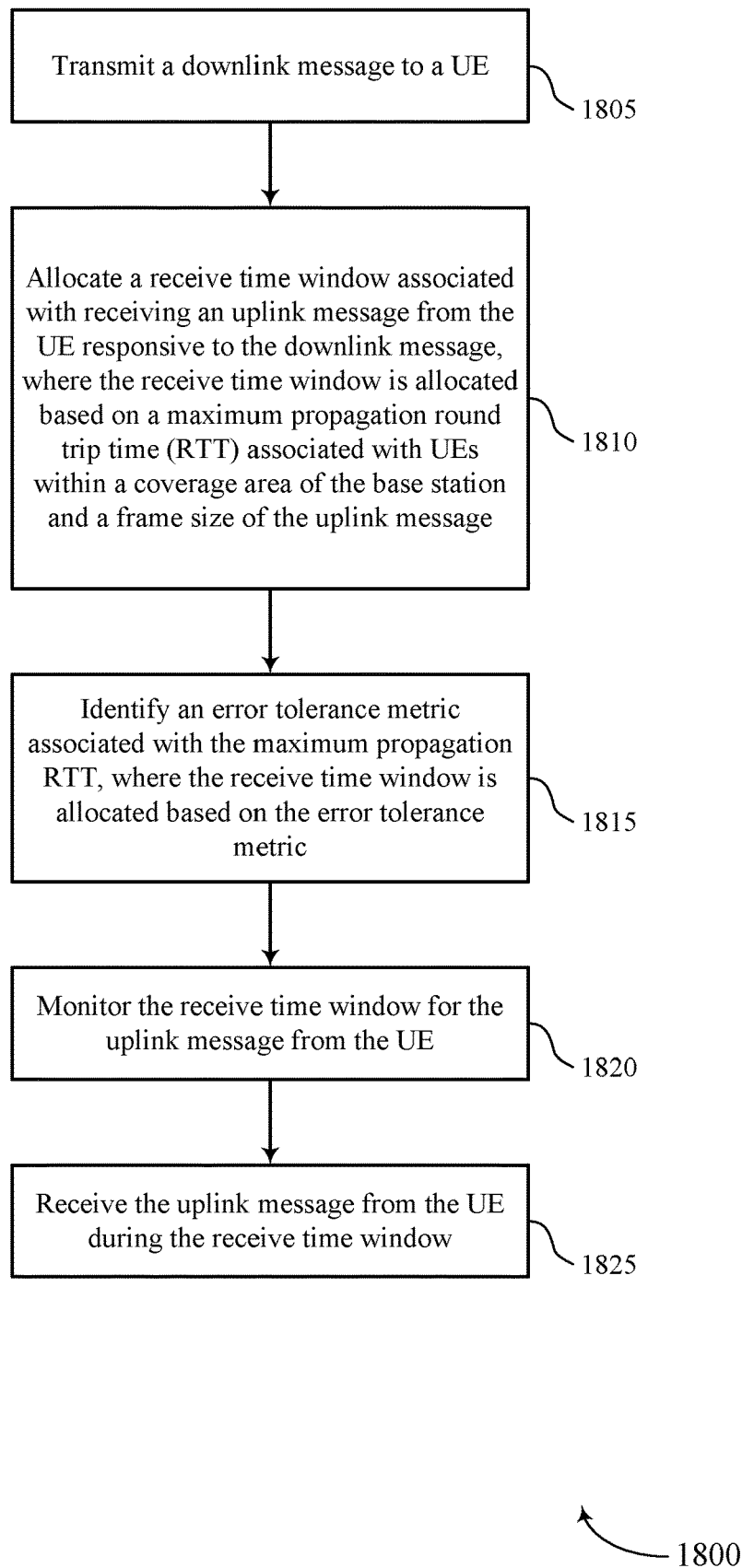

FIG. 18 shows a flowchart illustrating a method 1800 for uplink transmissions in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described herein. Additionally or alternatively, the base station 105 may perform aspects of the functions described herein using special-purpose hardware.

At 1805 the base station 105 may transmit a downlink message to a UE. The operations of 1805 may be performed according to the methods described herein. In certain examples, aspects of the operations of 1805 may be performed by a downlink manager as described with reference to FIGS. 9 through 12.

At 1810 the base station 105 may allocate a receive time window associated with receiving an uplink message from the UE responsive to the downlink message, and the receive time window is allocated based at least in part on a maximum propagation RTT associated with UEs within a coverage area of the base station and a frame size of the uplink message. The operations of 1810 may be performed according to the methods described herein. In certain examples, aspects of the operations of 1810 may be performed by a time window manager as described with reference to FIGS. 9 through 12.

At 1815 the base station 105 may identify an error tolerance metric associated with the maximum propagation RTT, and the receive time window is allocated based at least in part on the error tolerance metric. The operations of 1815 may be performed according to the methods described herein. In certain examples, aspects of the operations of 1815 may be performed by an error tolerance manager as described with reference to FIGS. 9 through 12.

At 1820 the base station 105 may monitor the receive time window for the uplink message from the UE. The operations of 1820 may be performed according to the methods described herein. In certain examples, aspects of the operations of 1820 may be performed by a uplink manager as described with reference to FIGS. 9 through 12.

At 1825 the base station 105 may receive the uplink message from the UE during the receive time window. The operations of 1825 may be performed according to the methods described herein. In certain examples, aspects of the operations of 1825 may be performed by a uplink manager as described with reference to FIGS. 9 through 12.

Figure 19:
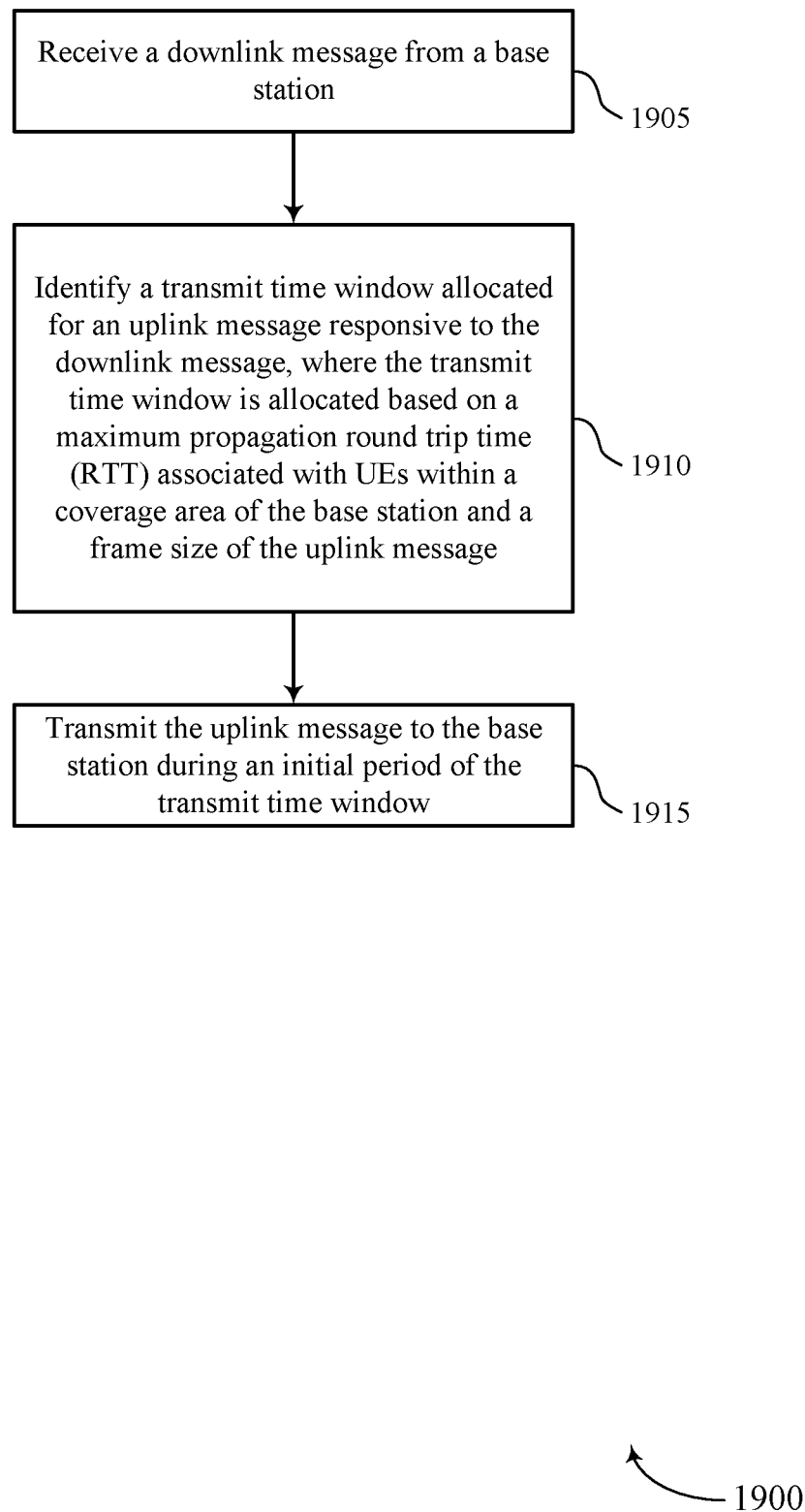

FIG. 19 shows a flowchart illustrating a method 1900 for uplink transmissions in accordance with aspects of the present disclosure. The operations of method 1900 may be implemented by a UE 115 or its components as described herein. For example, the operations of method 1900 may be performed by a UE communications manager as described with reference to FIGS. 13 through 16. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may receive a downlink message from a base station. The operations of 1905 may be performed according to the methods described herein. In certain examples, aspects of the operations of 1905 may be performed by a downlink manager as described with reference to FIGS. 13 through 16.

At 1910 the UE 115 may identify a transmit time window allocated for an uplink message responsive to the downlink message, and the transmit time window is allocated based at least in part on a maximum propagation RTT associated with UEs within a coverage area of the base station and a frame size of the uplink message. The operations of 1910 may be performed according to the methods described herein. In certain examples, aspects of the operations of 1910 may be performed by a time window manager as described with reference to FIGS. 13 through 16.

At 1915 the UE 115 may transmit the uplink message to the base station during an initial period of the transmit time window. The operations of 1915 may be performed according to the methods described herein. In certain examples, aspects of the operations of 1915 may be performed by a uplink manager as described with reference to FIGS. 13 through 16.

Figure 20:
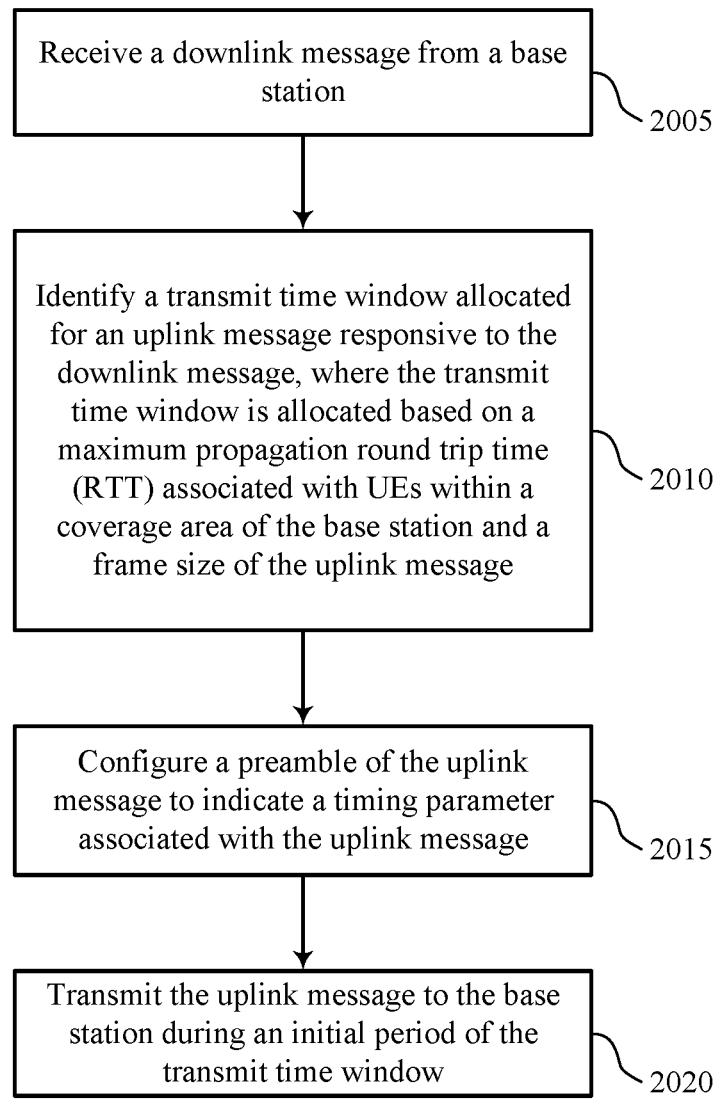

FIG. 20 shows a flowchart illustrating a method 2000 for uplink transmissions in accordance with aspects of the present disclosure. The operations of method 2000 may be implemented by a UE 115 or its components as described herein. For example, the operations of method 2000 may be performed by a UE communications manager as described with reference to FIGS. 13 through 16. In some examples, a UE 115 may execute a set of codes to control the functional elements of the device to perform the functions described herein. Additionally or alternatively, the UE 115 may perform aspects of the functions described herein using special-purpose hardware.

At 2005 the UE 115 may receive a downlink message from a base station. The operations of 2005 may be performed according to the methods described herein. In certain examples, aspects of the operations of 2005 may be performed by a downlink manager as described with reference to FIGS. 13 through 16.

At 2010 the UE 115 may identify a transmit time window allocated for an uplink message responsive to the downlink message, and the transmit time window is allocated based at least in part on a maximum propagation RTT associated with UEs within a coverage area of the base station and a frame size of the uplink message. The operations of 2010 may be performed according to the methods described herein. In certain examples, aspects of the operations of 2010 may be performed by a time window manager as described with reference to FIGS. 13 through 16.

At 2015 the UE 115 may configure a preamble of the uplink message to indicate a timing parameter associated with the uplink message. The operations of 2015 may be performed according to the methods described herein. In certain examples, aspects of the operations of 2015 may be performed by a timing parameter manager as described with reference to FIGS. 13 through 16.

At 2020 the UE 115 may transmit the uplink message to the base station during an initial period of the transmit time window. The operations of 2020 may be performed according to the methods described herein. In certain examples, aspects of the operations of 2020 may be performed by a uplink manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   transmitting a radio frequency downlink message to a user equipment (UE);
   allocating a timing of a receive time window associated with receiving a radio frequency uplink message from the UE responsive to the radio frequency downlink message, wherein the timing of the receive time window is allocated based at least in part on a maximum propagation round trip time (RTT) associated with UEs within a coverage area of the base station and a frame size of the radio frequency uplink message;
monitoring the receive time window for the radio frequency uplink message from the UE; and
receiving the radio frequency uplink message from the UE during the receive time window.

2. The method of claim 1, wherein transmitting the radio frequency downlink message comprises:
transmitting the radio frequency downlink message without a request that the UE use a timing advance in connection with the radio frequency uplink message.

3. The method of claim 1, further comprising:
identifying an error tolerance metric associated with the maximum propagation RTT, wherein the timing of the receive time window is allocated based at least in part on the error tolerance metric.

4. The method of claim 1, further comprising:
configuring a preamble of the radio frequency downlink message to indicate a timing parameter associated with the radio frequency downlink message.

5. The method of claim 4, wherein configuring the preamble comprises:
configuring at least one of a reference signal, or a synchronization signal, or a beam refinement signal, or a combination thereof, to indicate the timing parameter.

6. The method of claim 4, wherein the radio frequency downlink message is transmitted during a transmit time window.

7. The method of claim 1, further comprising:
receiving the radio frequency uplink message using a base station receive beam configuration, wherein the radio frequency uplink message is a millimeter wave transmission.

8. The method of claim 1, further comprising:
determining that the UE is operating on a high-speed rail serviced by the base station, wherein the timing of the receive time window is allocated based at least in part on the UE operating on the high-speed rail.

9. The method of claim 1, wherein the timing of the receive time window is allocated based at least in part on a timing advance procedure not being performed.

10. The method of claim 1, further comprising:
decoding a preamble of the radio frequency uplink message to identify a timing parameter associated with the radio frequency uplink message, wherein the timing of the receive time window is allocated based at least in part on the timing parameter.

11. The method of claim 10, wherein the preamble comprises at least one of a reference signal, or a synchronization signal, or a beam refinement signal, or a combination thereof, to indicate the timing parameter.

12. A method for wireless communication at a user equipment (UE), comprising:
receiving a radio frequency downlink message from a base station;
identifying a timing of a transmit time window allocated for a radio frequency uplink message responsive to the radio frequency downlink message, wherein the timing of the transmit time window is allocated based at least in part on a maximum propagation round trip time (RTT) associated with UEs within a coverage area of the base station and a frame size of the radio frequency uplink message; and
transmitting the radio frequency uplink message to the base station during an initial period of the transmit time window.

13. The method of claim 12, wherein transmitting the radio frequency uplink message comprises:
transmitting the radio frequency uplink message without first applying a timing advance in connection with the radio frequency uplink message.

14. The method of claim 12, wherein the timing of the transmit time window is identified based at least in part on the radio frequency downlink message.

15. The method of claim 12, further comprising:
decoding a preamble of the radio frequency downlink message to identify an indication of a timing parameter associated with the radio frequency downlink message.

16. The method of claim 15, wherein the preamble comprises at least one of a reference signal, or a synchronization signal, or a beam refinement signal, or a combination thereof, indicating the timing parameter.

17. The method of claim 12, further comprising:
receiving the radio frequency downlink message using a receive beam configuration of the UE, wherein the radio frequency downlink message is a millimeter wave transmission.

18. The method of claim 12, wherein the radio frequency uplink message is transmitted in response to receiving the radio frequency downlink message and is transmitted immediately after receiving the radio frequency downlink message.

19. The method of claim 12, wherein the timing of the transmit time window is allocated based at least in part on a timing advance procedure not being performed.

20. The method of claim 12, further comprising:
configuring a preamble of the radio frequency uplink message to indicate a timing parameter associated with the radio frequency uplink message.

21. The method of claim 20, wherein configuring the preamble comprises:
configuring at least one of a reference signal, or a synchronization signal, or a beam refinement signal, or a combination thereof, to indicate the timing parameter.

22. The method of claim 12, further comprising:
identifying an error tolerance metric associated with the maximum propagation RTT, wherein the timing of the transmit time window is allocated based at least in part on the error tolerance metric.

23. The method of claim 12, further comprising:
transmitting the radio frequency uplink message using a transmit beam configuration of the UE, wherein the radio frequency uplink message is a millimeter wave transmission.

24. An apparatus for wireless communication, comprising:
a processor;
memory in electronic communication with the processor; and
instructions stored in the memory and executable by the processor to cause the apparatus to:
transmit a radio frequency downlink message to a user equipment (UE);
allocate a timing of a receive time window associated with receiving a radio frequency uplink message from the UE responsive to the radio frequency downlink message, wherein the timing of the receive time window is allocated based at least in part on a maximum propagation round trip time (RTT) associated with UEs within a coverage area of the apparatus and a frame size of the radio frequency uplink message;

monitor the receive time window for the radio frequency uplink message from the UE; and receive the radio frequency uplink message from the UE during the receive time window.

25. The apparatus of claim 24, wherein the instructions to transmit the radio frequency downlink message are executable by the processor to cause the apparatus to:

transmit the radio frequency downlink message without a request that the UE use a timing advance in connection with the radio frequency uplink message.

26. The apparatus of claim 24, wherein the instructions are further executable by the processor to cause the apparatus to:

identify an error tolerance metric associated with the maximum propagation RTT, wherein the timing of the receive time window is allocated based at least in part on the error tolerance metric.

27. The apparatus of claim 24, wherein the instructions are further executable by the processor to cause the apparatus to:

configure a preamble of the radio frequency downlink message to indicate a timing parameter associated with the radio frequency downlink message.

28. An apparatus for wireless communication, comprising:

a processor;

memory in electronic communication with the processor; and instructions stored in the memory and executable by the processor to cause the apparatus to:

receive a radio frequency downlink message from a base station;

identify a timing of a transmit time window allocated for a radio frequency uplink message responsive to the radio frequency downlink message, wherein the timing of the transmit time window is allocated based at least in part on a maximum propagation round trip time (RTT) associated with UEs within a coverage area of the base station and a frame size of the radio frequency uplink message; and transmit the radio frequency uplink message to the base station during an initial period of the transmit time window.

29. The apparatus of claim 28, wherein the instructions to transmit the radio frequency uplink message are executable by the processor to cause the apparatus to:

transmit the radio frequency uplink message without first applying a timing advance in connection with the radio frequency uplink message.

30. The apparatus of claim 28, wherein the instructions are further executable by the processor to cause the apparatus to:

decode a preamble of the radio frequency downlink message to identify an indication of a timing parameter associated with the radio frequency downlink message.

31. The method of claim 12, wherein receiving the radio frequency downlink message comprises:

receiving a control message that includes control information, wherein the radio frequency uplink message is transmitted based at least in part on the control information.

* * * * *